US011535466B2

(12) United States Patent
Parsons

(10) Patent No.: US 11,535,466 B2
(45) Date of Patent: Dec. 27, 2022

(54) VEHICLE PROXIMITY SENSOR FOR POSITIONING A VEHICLE AT A LOADING DOCK

(71) Applicant: FedEx Ground Package System, Inc., Coraopolis, PA (US)

(72) Inventor: Brandon B. L. Parsons, Lakeport, CA (US)

(73) Assignee: FEDEX CORPORATE SERVICES, INC., Memphis, TN (US)

( * ) Notice: Subject to any disclaimer, the term of this patent is extended or adjusted under 35 U.S.C. 154(b) by 729 days.

(21) Appl. No.: 16/289,894

(22) Filed: Mar. 1, 2019

(65) Prior Publication Data

US 2020/0277149 A1 Sep. 3, 2020

(51) Int. Cl.
*B65G 69/00* (2006.01)
*G08G 1/16* (2006.01)
*B60R 1/00* (2022.01)

(52) U.S. Cl.
CPC ............ *B65G 69/003* (2013.01); *B60R 1/002* (2013.01); *G08G 1/16* (2013.01); *B65G 2203/042* (2013.01)

(58) Field of Classification Search
CPC .. B65G 69/003; B65G 2203/042; G08G 1/16; B60R 1/002
See application file for complete search history.

(56) References Cited

U.S. PATENT DOCUMENTS

| 2003/0145535 | A1* | 8/2003 | DiBiase | B65G 69/006 52/173.2 |
| 2008/0042865 | A1* | 2/2008 | Shephard | B65G 69/006 340/686.6 |
| 2017/0101278 | A1* | 4/2017 | Stone | G08B 21/02 |
| 2020/0255234 | A1* | 8/2020 | Sveum | B65G 67/20 |

\* cited by examiner

*Primary Examiner* — James M Pontius
(74) *Attorney, Agent, or Firm* — Finnegan, Henderson, Farabow, Garrett & Dunner LLP

(57) ABSTRACT

A loading dock having a sensing device to determine proximity of a vehicle to the loading dock is disclosed. The loading dock includes a loading bay. The loading dock also includes a driving platform that receives a vehicle approaching the loading dock. The driving platform is positioned beneath the loading bay. The loading dock include a loading platform extending from the loading bay. The loading dock is equipped with a sensing device attached to the loading platform. The sensing device determines and monitors a distance between the vehicle and the loading platform. The loading dock also includes an indicating device that generates a signal when the distance between the vehicle and the loading platform is less than a threshold distance.

34 Claims, 15 Drawing Sheets

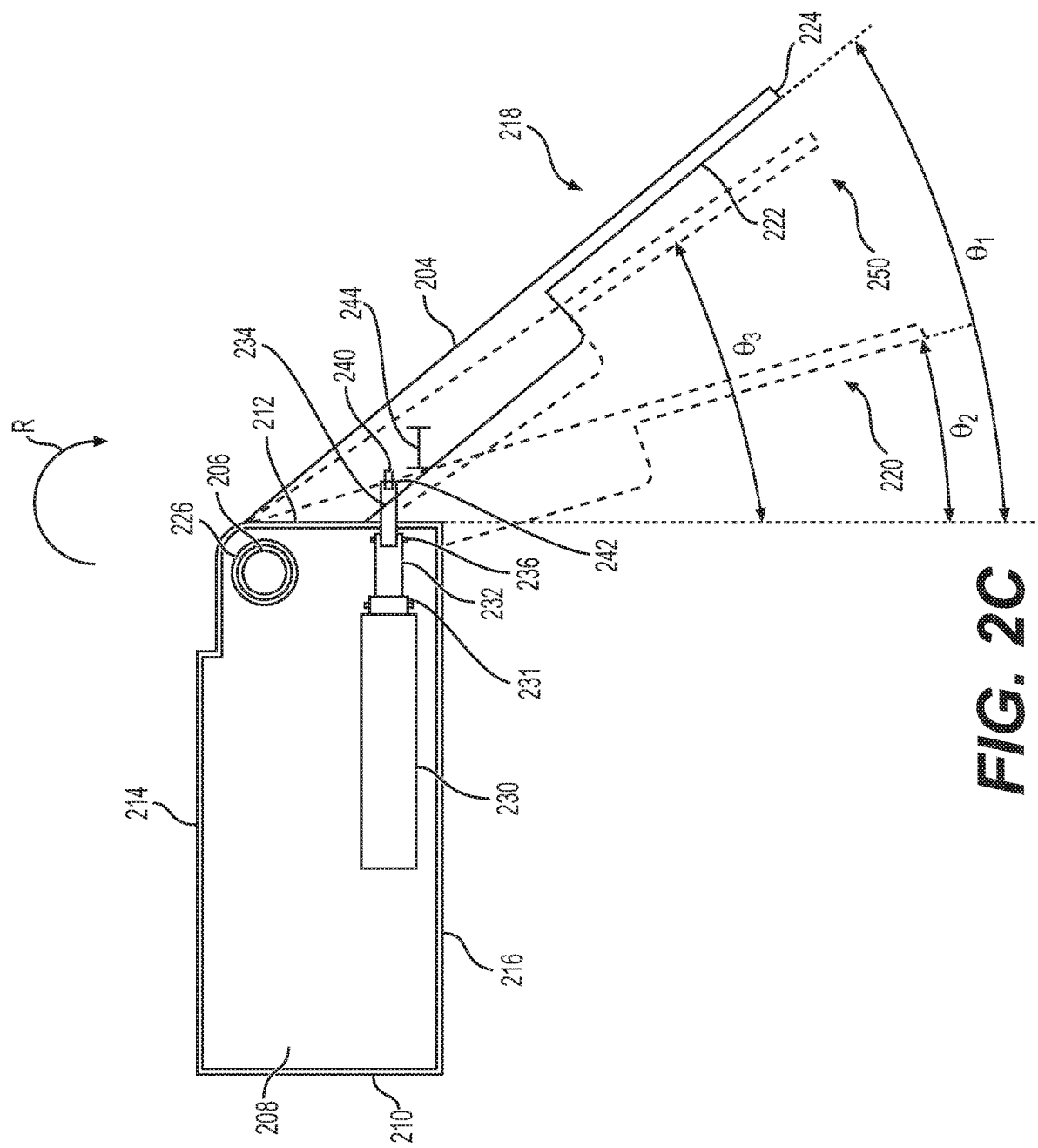

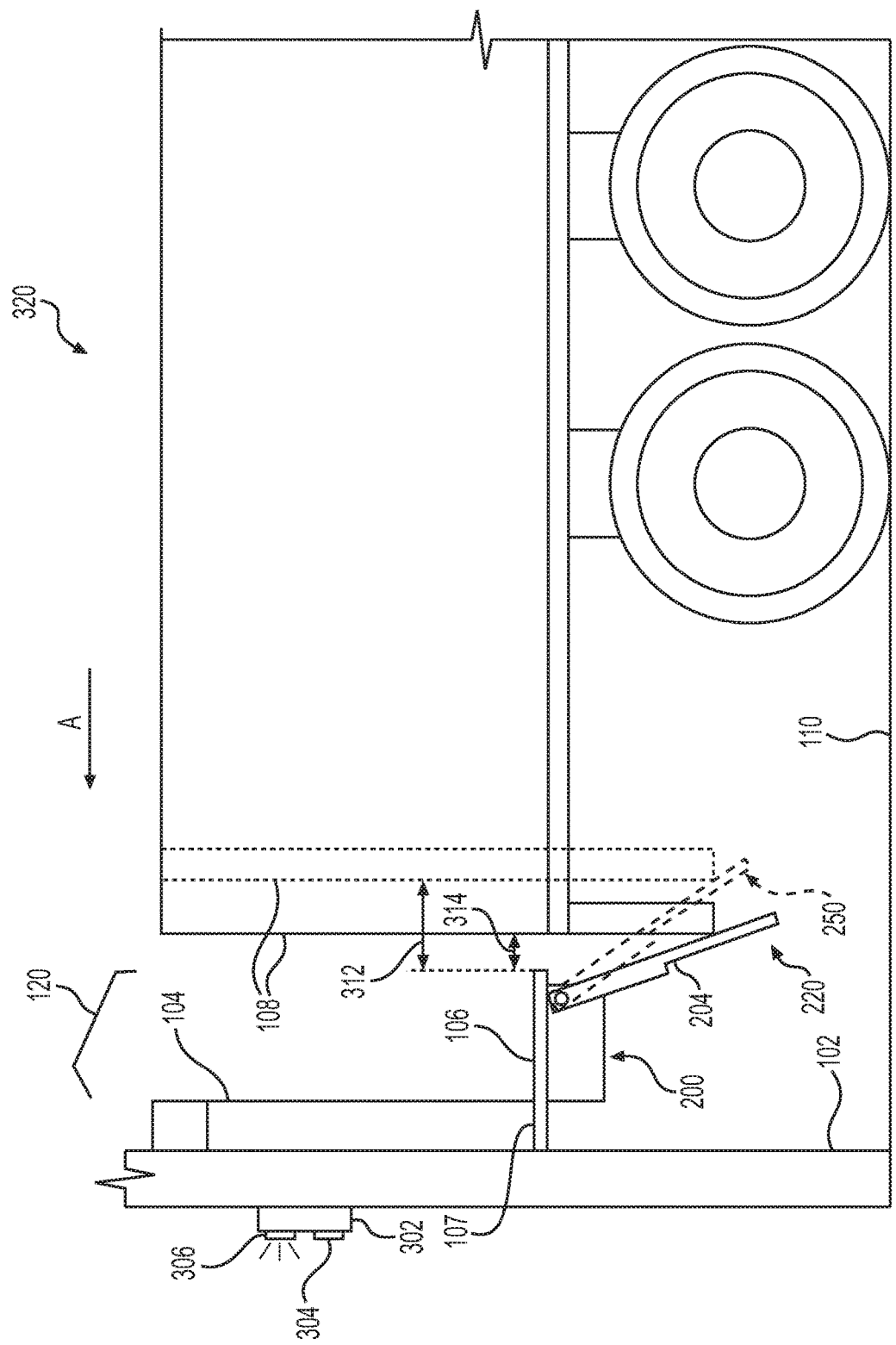

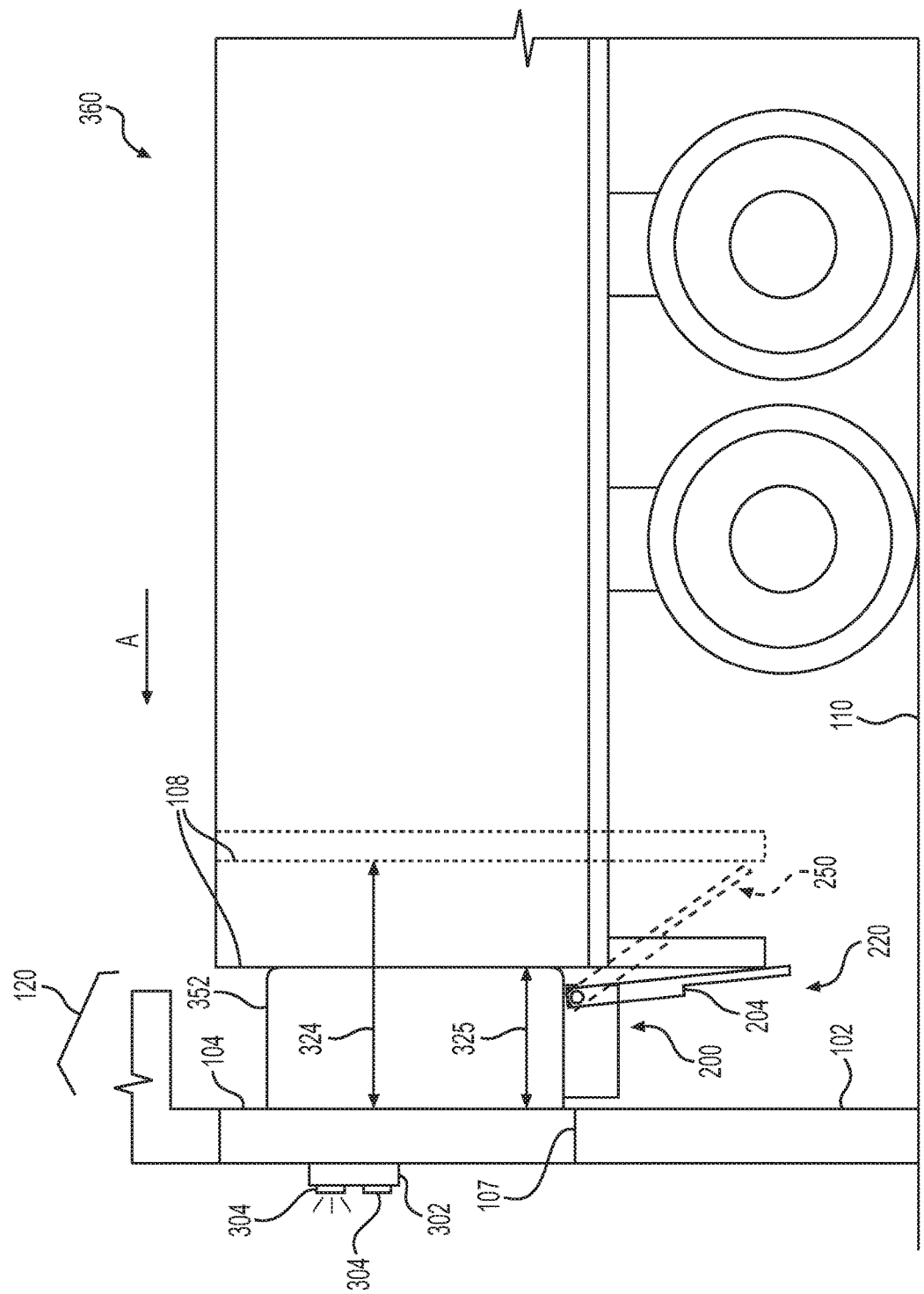

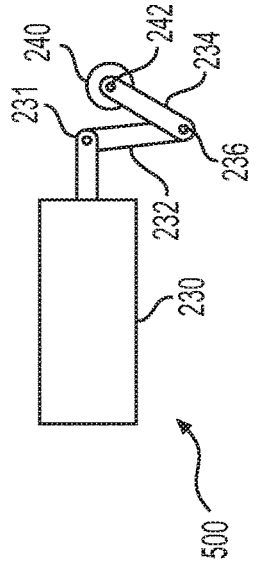
FIG. 5A
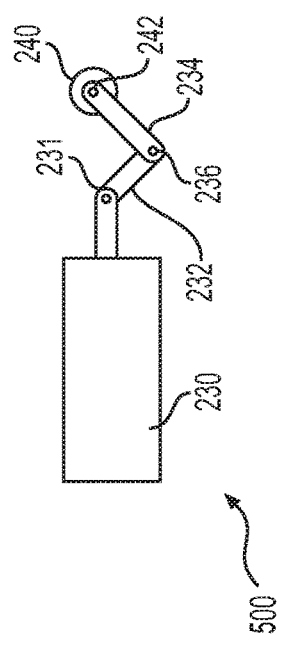
FIG. 5B
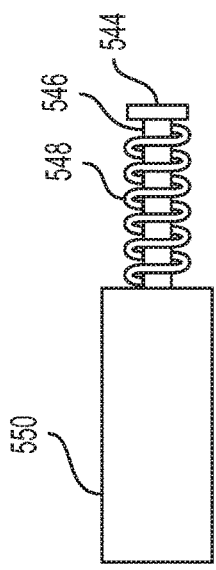
FIG. 5C
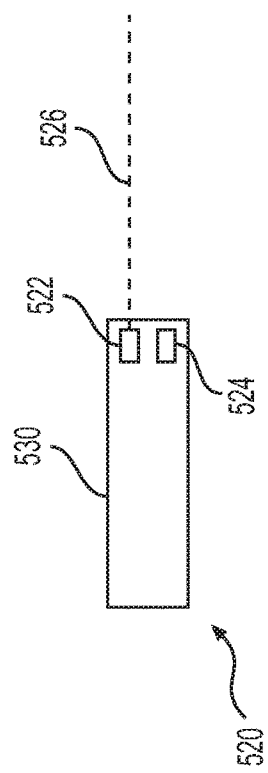
FIG. 5E
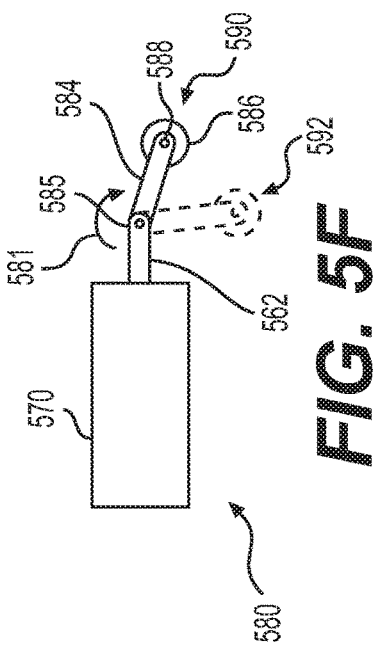
FIG. 5D
FIG. 5F

VEHICLE PROXIMITY SENSOR FOR POSITIONING A VEHICLE AT A LOADING DOCK

FIELD

The present disclosure relates generally to a vehicle proximity sensor, and more particularly, to a proximity sensor for positioning the vehicle at a loading dock.

BACKGROUND

Vehicles such as semi-trailers or trailers are used to move a wide range of items from one place to another for a variety of reasons. Such items may include foodstuffs, beverages, manufacturing supplies, materials, packages for delivery, machinery, or other consumer or industrial goods. Moving these items requires sophisticated loading and unloading operations. In some loading and unloading operations, the vehicles are positioned at loading docks to allow persons or vehicles to transfer items on to and/or off from the vehicles. The items may be sorted and sent to processing centers for delivery, or the items may be unloaded from one vehicle to be loaded on to another vehicle.

Loading and unloading operations typically involve the use of many different types of vehicles, including semi-trailers, trailers, trucks, box trucks, and/or vehicles built to transport items. Different types of vehicles may have different structures surrounding a trailer, a trailer bed, a truck bed, or a box truck bed, for example, to support different trailer bed widths or heights. In some loading and unloading operations, loading docks may be configured so that many different types of vehicles can be positioned at the loading docks without modification to the loading docks.

Many loading docks include a bay positioned at a predetermined height above a driving platform. When a vehicle is parked at a loading dock, the height of the bay is substantially at the height of, for example, a trailer bed associated with the vehicle. In some loading docks, the vehicle may be positioned at a distance from the bay. Other loading docks may include a loading platform to bridge the distance and/or a change in height between the bay and the vehicle. Because the bay and the trailer bed are located at a height above the driving platform, any distance or gap between the bay and the trailer bed may allow items to fall through the gap, cause loading and unloading vehicles to be stuck in the gap, cause damage to the loading and unloading vehicles, and/or may create a significant risk of injury to persons associated with the loading and unloading operations.

The vehicles may also move after being parked at the loading dock, due to settling of the vehicle structure, a brake system fault, or other reasons. Such movement, also known as creep, may allow the distance or gap between the bay and the trailer bed to increase, creating a hazardous condition for the loading and unloading vehicles or for the persons associated with the loading and unloading operations. Loading platforms are also susceptible to creep issues.

Typically, persons are employed to watch a vehicle's approach, exit, or loading procedure. If the vehicle's approach is spotted, the persons may direct the vehicle to back up to a loading dock. Persons may further alert the driver of when the vehicle has reached a position for loading and/or unloading items. Additionally, persons may measure a distance or gap between the bay and the vehicle to ensure that the distance is less than two inches to protect persons associated with loading and/or unloading the vehicle from injury when moving from the loading dock to the vehicle. Persons may also check the distance between the bay and the vehicle after the vehicle has been parked at the loading dock for a period of time to ensure that the distance or gap does not increase beyond two inches.

These and similar methods are inefficient and costly, and changes in the size of the distance or gap between the bay and the vehicle may go undetected. Many vehicles may remain parked at a loading dock facility for a period of time, and it may be necessary to check the distance multiple times at a single loading dock. Due to the high frequency of vehicles approaching one or more loading docks, significant losses of production may result because of the time required to manually inspect the distance between the bay and the vehicle one or more times. Furthermore, errors in measuring the distance or in detecting the presence of the distance may result in the presence of an excessively large distance between the bay and the vehicle, which in turn may result in injury to personnel, or damage to or loss of property (e.g. to one or more items).

Given the time, expense, and loss of production associated with manually checking distances or gaps between vehicles and loading docks, it is desirable to have an improved system and method for detecting and/or monitoring the distances or gaps and indicating that vehicles are correctly positioned at one or more loading docks.

SUMMARY

In the following description, certain aspects and embodiments will become evident. It is contemplated that the aspects and embodiments, in their broadest sense, could be practiced without having one or more features of these aspects and embodiments. It is also contemplated that these aspects and embodiments are merely exemplary.

One aspect of the disclosure relates to a loading dock. The loading dock may include a loading bay, a driving platform, a loading dock wall, a sensing device, and an indicating device. The driving platform may be configured to receive a vehicle approaching the loading dock. The driving platform may be at a height below the loading bay. The sensing device may be attached to the loading bay. The sensing device may be configured to determine if a distance between the vehicle and the loading bay is less than a threshold distance. The indicating device may be configured to generate an indication when the distance between the vehicle and the loading bay is less than the threshold distance.

Another aspect of the disclosure relates to a sensing device. The sensing device may include a base, a sensor, and an indicating device. The base may be configured to be connected to a loading dock. The sensor may be attached to the base. The sensor may be configured to determine if a vehicle is at a distance less than a threshold distance from the loading dock. The indicating device may be configured to generate an indication when the vehicle is at a distance less than the threshold distance from the loading dock.

Another aspect of the disclosure relates to a method of sensing a proximity of a vehicle to a loading dock. The method may include moving the vehicle towards the loading dock on a driving platform proximate the loading dock. The method may include determining, using a sensing device connectedly attached to the loading dock, a distance between the vehicle and the loading dock. The method may include determining whether the distance is less than a threshold distance. The method may include generating, using an indicating device, an indication if the distance is less than the threshold distance.

It is to be understood that both the foregoing general description and the following detailed description are exemplary and explanatory only and are not restrictive of the invention. The accompanying drawings, which are incorporated in and constitute a part of this specification, illustrate several exemplary embodiments and together with the description, serve to outline principles of the exemplary embodiments.

BRIEF DESCRIPTION OF THE DRAWINGS

FIG. 2C illustrates a side view of the exemplary sensing device of FIG. 2A.

FIGS. 3A-3F illustrate exemplary arrangements of a loading dock with a vehicle.

FIGS. 5A-5F illustrate exemplary embodiments of a sensor.

DETAILED DESCRIPTION

Reference will now be made in detail to exemplary embodiments shown in the accompanying drawings. Exemplary disclosed embodiments include devices, systems, and methods for sensing a proximity of a vehicle to a loading dock during a loading and unloading operation at the loading dock. In some embodiments, for example, the loading dock may include a vehicle sensing device. The vehicle sensing device may include a base, a sensor, and an indicating device. The vehicle sensing device may be used in a method or system for sensing the proximity of the vehicle to a loading dock. The disclosed embodiments may reduce a complexity associated with determining the proximity of the vehicle when compared to conventional methods, for example, by reducing and/or eliminating costly methods associated with manually determining the proximity of the vehicle by previously known methods. The disclosed embodiments may also reduce and/or eliminate a likelihood of injury associated with erroneous determinations of the proximity of the vehicle resulting from conventional methods. Thus, the disclosed embodiments may help ensure a safer work environment and a more cost effective loading and unloading operation as compared to previously known, conventional methods.

The disclosed embodiments may be used to sense the proximity of vehicles, such as trailers, semi-trailers, box trucks, vehicles built to transport items, and other vehicles used in loading and unloading operations at, for example, a loading dock. It is contemplated that some vehicles may have a rear structure that may contact the loading dock, the rear structure including at least one of a door, a tire, a chassis, a bumper, a supporting structure, a gate, or other vehicle components.

Figure 1:
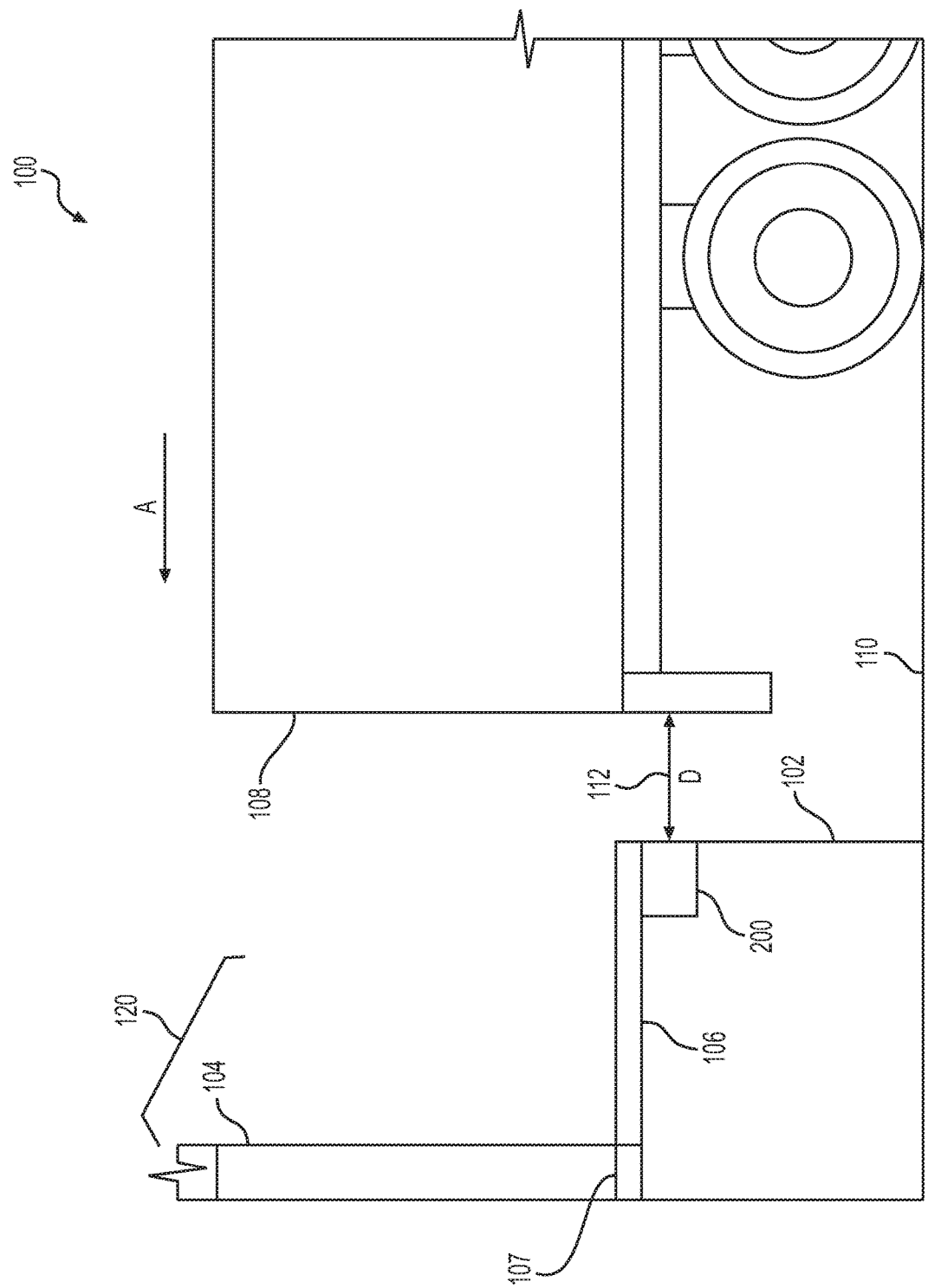
FIG. 1 illustrates an exemplary embodiment of components associated with a loading and unloading operation.

FIG. 1 illustrates an exemplary loading dock consistent with the present disclosure. Exemplary loading docks and vehicle proximity sensing devices are described with reference to FIGS. 2, 3, 4, 5, and 6. An exemplary method of vehicle proximity sensing is described with reference to FIGS. 7A and 7B. It is contemplated that one or more of the disclosed sensing devices and systems may be used to perform the method disclosed in FIGS. 7A and 7B.

FIG. 1 shows an exemplary loading dock configuration 100 associated with loading dock 120. In some embodiments, loading dock 120 may include loading dock wall 102, passageway 104, loading platform 106, loading bay 107, and driving surface 110. Loading platform 106 may protrude from passageway 104. Loading platform 106 may be substantially perpendicular to passageway 104. In some embodiments, however, loading platform 106 may be positioned at an angle relative to passageway 104. The angle of loading platform 106 relative to loading bay 107 may be at an inclined angle (i.e. a positive acute angle) to allow access to vehicle 108 of a height greater than a height of loading bay 107. The angle of loading platform 106 may be at a declined angle (i.e. a negative acute angle) to allow access to vehicle 108 of a height lesser than the height of loading bay 107. For example, loading platform 106 may be an extension of loading bay 107. Loading platform 106 may be connected to loading dock wall 102. In some embodiments, loading platform 106 may protrude from loading dock wall 102 towards vehicle 108. Driving platform 110 may be positioned below loading platform 106 and loading bay 107 and may be configured to receive vehicle 108 as vehicle 108 approaches loading dock 120.

Passageway 104 may include a bay door (not shown) to allow passage of persons, machinery, and vehicles to load and unload vehicle 108. Vehicle 108 may approach loading dock 120 along direction A. For example, vehicle 108 may be driven on or may travel on driving platform 110, which may be a driveway or of an approach road adjacent loading dock 120. Gap 112 may separate vehicle 108 from loading platform 106, shown as distance D in FIG. 1. It is contemplated that in some exemplary embodiments, loading dock 120 may not include loading platform 106 and in those embodiments, gap 112 may be a distance between vehicle 108 and loading bay 107. It is also contemplated that vehicle 108 may move away from loading bay 107 and/or loading platform 106 due to creep over a period of time. Movement of vehicle 108 in this manner may cause gap 112 to be created and/or to increase in distance.

Sensing device 200 may be positioned adjacent loading platform 106. Sensing device 200 may be positioned in a cavity within loading dock wall 102. Although FIG. 1 depicts sensing device as being located at a particular position on loading platform 106, it is contemplated that sensing device 200 may be positioned anywhere on the loading platform 106. For example, in some exemplary embodiments, loading platform 106 may project from loading bay 107 but may not be supported by loading dock wall 102. In these exemplary embodiments, sensing device may be positioned anywhere along a length of loading platform 106. It is also contemplated that, in some exemplary embodiments, sensing device 200 may be positioned on at least one of: passageway 104, loading dock wall 102, loading bay 107, or driving platform 110.

Figure 2A:
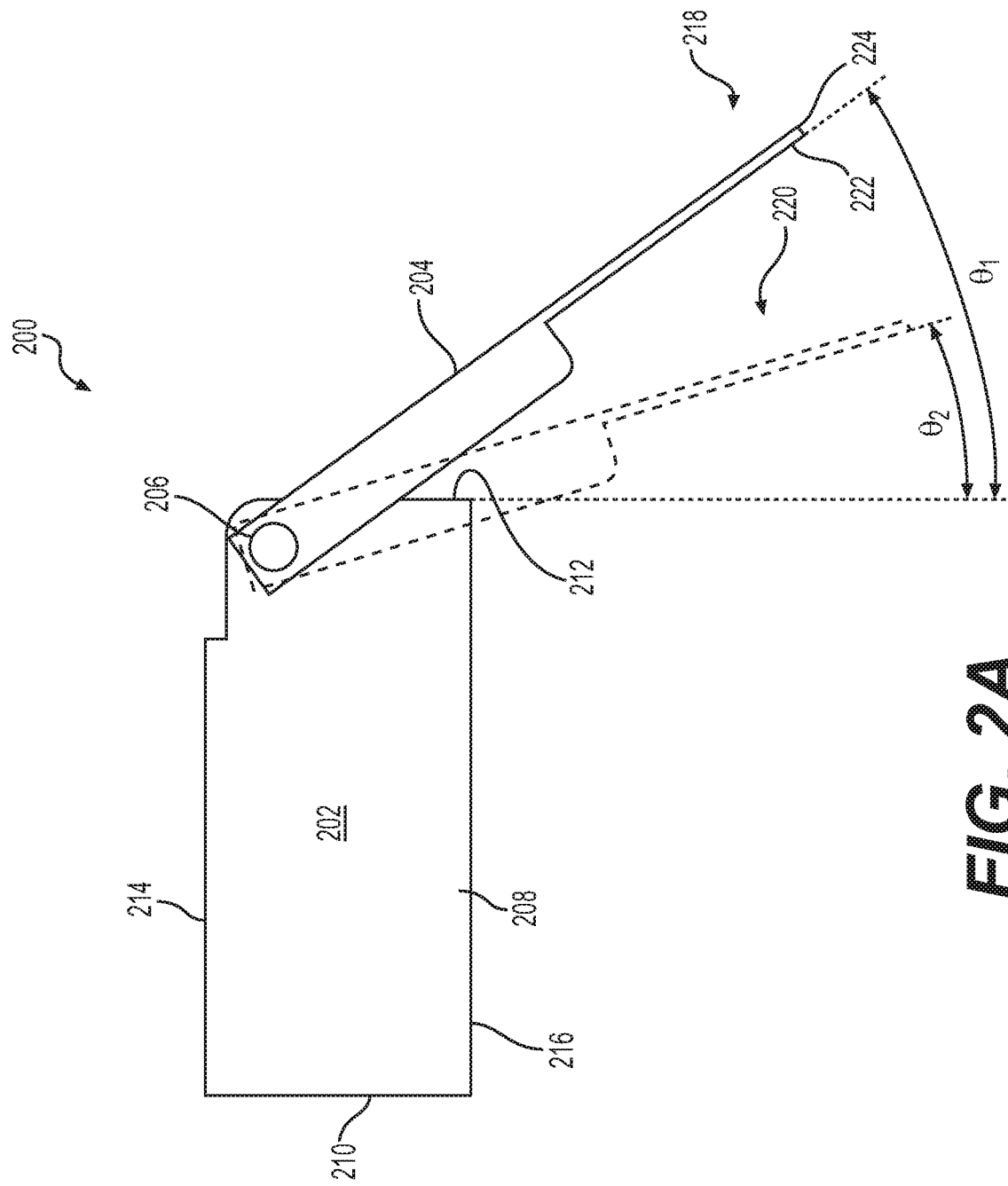
FIG. 2A illustrates an exemplary embodiment of a sensing device.

FIG. 2A illustrates a side view of an exemplary vehicle sensing device 200. Vehicle sensing device 200 may include body 202, receiving platform 204, and shaft 206. Body 202 may define an enclosure, including one or more side walls 208, rear wall 210, front wall 212, top cover 214, and bottom cover 216. In some exemplary embodiments, side walls 208, rear wall 210, front wall 212, and top cover 214 may take the form of plates that may be fixedly or removably attached to each other. For example, rear wall 210 and top cover 214 may be welded together. In another example, side wall 208 and bottom cover 216 may be produced from the same piece of material. It is contemplated that in some exemplary embodiments, one or more walls (e.g. 208, 210, 212) or covers (e.g. 214, 216) may be made from a combination of smaller plates.

As illustrated in FIG. 2A, body 202 may have a generally cuboidal shape, although other shapes (e.g. cylindrical, polygonal, etc.) are also contemplated. It is also contemplated that body 202 may include only some of side walls 208, rear wall 210, front wall 212, and/or top cover 214. For example, body 202 may include only rear wall 210. As another example, body 202 may include rear wall 210 and one side wall 208. Body 202 may be sealed, for example, between each wall and each adjacent wall or cover, such as to enclose internal systems to protect those systems from water or wind damage. Body 202 may be produced from separate attachable plates, from a single sheet of material, or may be made by machining a single block of material.

In some embodiments, receiving platform 204 may be pivotably connected to body 202. For example, receiving platform 204 may be configured to rotate around shaft 206. Shaft 206 may be located adjacent top cover 214, as shown in FIG. 2. It is also contemplated that in some embodiments, shaft 206 may be located adjacent rear wall 210 or adjacent side wall 208. In some embodiments, receiving platform 204 may have a first (or default or receiving) position 218 in which receiving platform 204 may be inclined relative to front wall 212 when no external force is applied to receiving platform 204. As used in this disclosure, the term inclined should be interpreted to mean that surfaces inclined to each other are not parallel to or perpendicular to each other. Thus, for example, receiving platform 204 may be disposed at an angle $\theta_1$ relative to front wall 212. It is contemplated that additionally or alternatively, receiving platform 204 may be inclined relative to side walls 208.

Receiving platform 204 may be configured to be contacted by vehicle 108. For example, receiving platform 204 may be configured to be contacted by at least one of: a rear structure proximate the top of vehicle 108, a rear structure proximate the bottom of vehicle 108, a rear structure proximate the side of vehicle 108, a wheel (e.g. tire) of vehicle 108, or a component proximate a rear structure of vehicle 108. Receiving platform 204 may be configured to move from first position 218 to second position 220 when an external force is applied to some or all portions of receiving platform 204. The external force may be applied to receiving platform 204 by engagement with and movement of vehicle 108. As illustrated in FIG. 2A, in second position 220, receiving platform 204 may be inclined at an angle $\theta_2$, different from angle $\theta_1$, relative to front wall 212 of vehicle sensing device 200. It is also contemplated that in some exemplary embodiments, in second position 220, receiving platform 204 may be oriented at an angle $-\theta_2$ relative to front wall 212 such that lower end 224 of receiving platform 204 may be disposed between rear wall 210 and front wall 212 of sensing device 200. It is further contemplated that in some exemplary embodiments, in second position 220, receiving platform 204 may be disposed generally parallel to front wall 212 so that angle $\theta_2$ may be substantially zero.

Although the external force applied on receiving platform 204 has been described above as being imparted by vehicle 108, it is contemplated that additionally or alternatively, the external force may be applied by an actuator configured to change the position of receiving platform 204. The actuator may include a substantially linear actuator configured to push or pull on surface 222 of receiving platform 204 so as to cause receiving platform 204 to rotate around shaft 206. Additionally, or alternatively, the actuator may include a rotational actuator configured to rotate shaft 206 to cause receiving platform 204 to move. It is further contemplated that in some embodiments, receiving platform 204 may be configured to remain stationary (i.e. immovable) when contacted by vehicle 108.

Figure 2B:
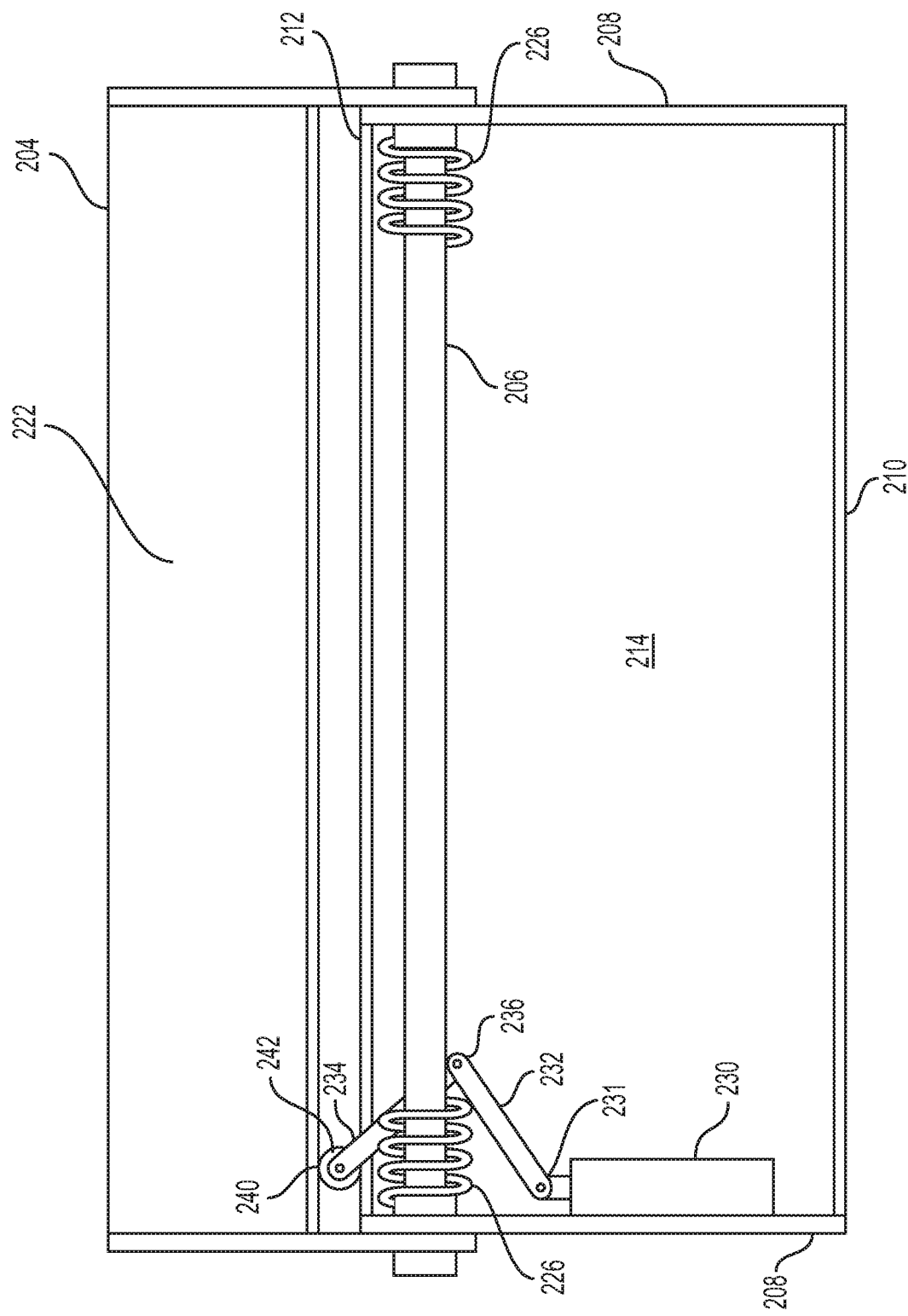
FIG. 2B illustrates a bottom view of the exemplary sensing device of FIG. 2A.

FIG. 2B illustrates an exemplary bottom view of vehicle sensing device 200 with bottom cover 216 removed. As illustrated in FIG. 2B, shaft 206 may extend over an entire width of sensing device 200. It is contemplated, however, that in some exemplary embodiments, shaft 206 may be in the form of a pair of shorter discrete shafts, each being positioned adjacent each side wall 208 and configured to permit receiving platform 204 to be pivotably connected to side walls 208. It is also contemplated that in other exemplary embodiments, receiving platform 204 may be pivotably connected to one or more of side walls 208 via other mechanisms (e.g. hinges, rollers, or other types of pivotable joints).

Vehicle sensing device 200 may include sensor 230, sensor arm 232, sensor contact 240, and spring 226. Sensor 230 may be fixedly attached to body 202. It is contemplated, that alternatively, sensor 230 may be attached, for example, to a plate that may be configured to slide relative to side wall 208 for ease of accessibility, for instance, to replace sensor 230 or to perform maintenance on sensor 230.

Sensor 230 may be attached with the use of a moving component such as spring 226 such that sensor 230 can detect the movement of receiving platform 204 without being subject to excessive external forces, such as by vehicle 108. In some exemplary embodiments, sensor 230 may be attached to at least one of top cover 214 or rear wall 210. In other exemplary embodiments, sensor 230 may include a plurality of sensors attached to different walls (e.g. one or more of side walls 208, rear wall 210, front wall 212, top wall 214 of body 202). In one exemplary embodiment, as illustrated in FIG. 2B, sensor 230 may be fixedly attached to one of side walls 208.

Sensor arm 232 may be movably attached to sensor 230. For example, as illustrated in FIG. 2B, joint 231 may be proximate sensor 230 and may facilitate an attachment of sensor 230 and sensor arm 232. Joint 231 may be configured to allow sensor arm 232 to rotate around joint 231 and be pivotably connected to sensor 230. It is contemplated, however, that in some exemplary embodiments, sensor arm 232 may be slidingly connected to sensor 230 such that sensor arm 232 may move generally parallel to side wall 208 and relative to sensor 230. Sensor arm 232 may also be movably attached to sensor arm 234. For example, as illustrated in FIG. 2B, sensor arm 232 may be pivotably attached to sensor arm 234 at joint 236. Joint 236 may be configured such that sensor arm 234 can rotate around joint 236. Sensor arm 234 may also be movably attached to sensor contact 240. For example, as illustrated in FIG. 2B, sensor arm 234 may be pivotably attached to sensor contact 240 at joint 242 of sensor contact 240. Sensor arm 232, sensor arm 234, joint 231, joint 236, and joint 242 may be configured to connect sensor 230 to sensor contact 240. It is contemplated, however, that in some exemplary embodiments, sensor arm 234 may be slidingly connected to sensor 230. It is also contemplated that in some exemplary embodiments, sensor contact 240 may be fixedly attached to sensor arm 234.

It is contemplated that sensor contact 240 may contact an inner surface 222 of receiving platform 204, for example, when receiving platform 204 is moved by vehicle 108.

Movement of receiving platform 204 in turn may facilitate a movement of sensor contact 240. Although FIG. 2B illustrates sensor contact 240 to include a roller, sensor contact 240 may be configured to have other shapes. For example, sensor contact 240 may be a substantially rounded end. As another example, sensor contact 240 may be a rectangular member. It is also contemplated that in some exemplary embodiments, vehicle sensing device 200 may not include sensor contact 240 and joint 242, and instead sensor arm 234 may be configured to contact inner surface 222 of receiving platform 204. It is also contemplated that in some exemplary embodiments, vehicle sending device may not include sensor arm 234 and sensor contact 240 may be connected to sensor arm 232 at joint 236.

In some exemplary embodiments, the movement of sensor contact 240 may be substantially rotational. In other exemplary embodiments, the movement of sensor contact 240 may be substantially linear. It is contemplated that in some embodiments, movement of receiving platform 204 may be limited so that receiving platform 204 may not be configured to move after coming into contact with sensor contact 240. It is contemplated that in such embodiments, receiving platform 204 may contact a stop positioned on, for example, shaft 206, to prevent movement of receiving platform 204 once sensor contact 240 is contacted.

In some exemplary embodiments, sensor arms 232, 234 may be biased towards an extended position with the use of springs (not shown). Springs may be substantially linear springs or rotational or torsional springs. In such configurations, springs may be located at joints 231, 236, and/or between sensor arms 232, 234. In some embodiments, sensor 230 may include an electric motor configured to extend or retract sensor arms 232, 234.

In some exemplary embodiments, sensor contact 240 may be connected to sensor 230 by a single joint and a single sensor arm, such as joint 231 and sensor arm 232. In such configurations, sensor contact 240 may be pivotably attached to sensor arm 232 and a joint, such as joint 242. In such configurations, joint 231 may include a spring that biases sensor arm 232 to be extended towards receiving platform 204. It is contemplated that sensor contact 240 may be fixedly attached to sensor arm 232.

In some exemplary embodiments, rear surface 222 of receiving platform 204 may be configured to contact sensor contact 240. In such configurations, rear surface 222 may include guiding features to guide a movement of sensor contact 240 when sensor contact 240 moves, for example, because of the movement of receiving platform 204. For example, rear surface 222 may include a magnetic feature to keep sensor contact 240 attached to rear surface 222 after rear surface 222 contacts sensor contact 240. By way of another example, rear surface 222 may include a clip (not shown) that may retain sensor contact 240. Yet another example, rear surface 222 may include a conductive surface configured to conduct a thermal or electrical signal when sensor contact 240 contacts rear surface 222. It is also contemplated that guide features for sensor contact 240 may be included one or more of side walls 208, rear wall 210, front wall 212, top cover 214, or bottom cover 216.

FIG. 2C illustrates a side view of vehicle sensing device 200 with at least one side wall 208 removed. As discussed above, receiving platform 204 may be configured to rotate around shaft 206 from first position 218 to second position 220 in a direction of rotation R. Spring 226 may apply a biasing force on receiving platform 204 to resist rotation of receiving platform 204 about shaft 206. As illustrated in FIG. 2C, when receiving plate 204 is in its first position 218, joint 242 and/or sensor contact 240 may be separated from an inner surface 222 of receiving platform 204 by gap 244. First position 218 may be a default position that receiving platform 204 may adopt under the biasing force applied by spring 226 when vehicle 108 is not in contact with receiving platform 204. Spring 226 may be a rotational or torsional spring. Rotation of receiving platform 204 around shaft 206 in the direction R may cause gap 244 to be substantially reduced to zero such that inner surface 222 of receiving platform 204 may come into contact with joint 242 and/or sensor contact 240 proximate the end of sensor arm 234. Receiving platform 204 may be disposed in third position 250 between first position 218 and second position 220 when inner surface 222 of receiving platform 204 comes into contact with sensor contact 240. In third position 250, receiving platform 204 may be inclined at an angle $\theta_3$ relative to front wall 212 of sensing device 200. In one exemplary embodiment, as illustrated in FIG. 2C, $\theta_2<\theta_3<\theta_1$. Thus, gap 244 may constitute a threshold distance by which receiving platform 204 must be moved before inner surface 222 may come into contact with sensor contact 240.

In some exemplary embodiments, additional rotation of receiving platform 204 towards second position 220 may cause joint 242 and/or sensor contact 240 to move (e.g. in a direction towards rear wall 210) due to the contact with receiving platform 204.

In one exemplary embodiment, sensor 230 may be a movement sensor configured to detect the movement of joint 242 and/or sensor contact 240. In such embodiments, sensor 230 may be configured to measure a rotation of sensor arm 232 around joint 231, for example, by an encoder included within sensor 230. In some exemplary embodiments, sensor 230 may be configured to measure an amount of movement of sensor contact 240 by including a laser-range finder. In other exemplary embodiments, one or more of sensor arms 232, 234 may include positions sensors, which may be configured to determine movement of joint 242, sensor arm 232, sensor arm 234, and/or sensor contact 240 towards sensor 230. It is contemplated that an arm with sensor contact 240, for example sensor arm 232, may be configured to slide into sensor 230 wherein sensor 230 measures an encoder that rotates along the side of sensor arm 232 as it moves between a retracted position and an extended position.

It is contemplated that in some exemplary embodiments, sensor 230 may be an electrical sensor configured to detect the contact of sensor contact 240 and receiving platform 204. For example, in such embodiments, a voltage or thermal differential may be established between one or more portions of sensor 230 (e.g. walls 208, 210, 212, or covers 214, 216) and rear surface 222 of receiving platform 204. Contact between rear surface 222 and joint 242 and/or sensor contact 240 may close an electrical circuit allowing a current flow between the contacting surface. Sensor 230 may be configured to detect the current flow and thus detect a contact between rear surface 222 of receiving platform 204 and joint 242 or sensor contact 240. It is further contemplated that in some exemplary embodiments, sensor 230 may be a thermal sensor configured to detect the contact of sensor contact 240 and receiving platform 204 because of a thermal differential between sensor contact 240 and rear surface 222. It is further contemplated that in some exemplary embodiments, sensor 230 may include an optical sensor, and the optical sensor may be configured to detect a surface of vehicle 108, for example, through a hole in receiving platform 204.

Figure 3A:
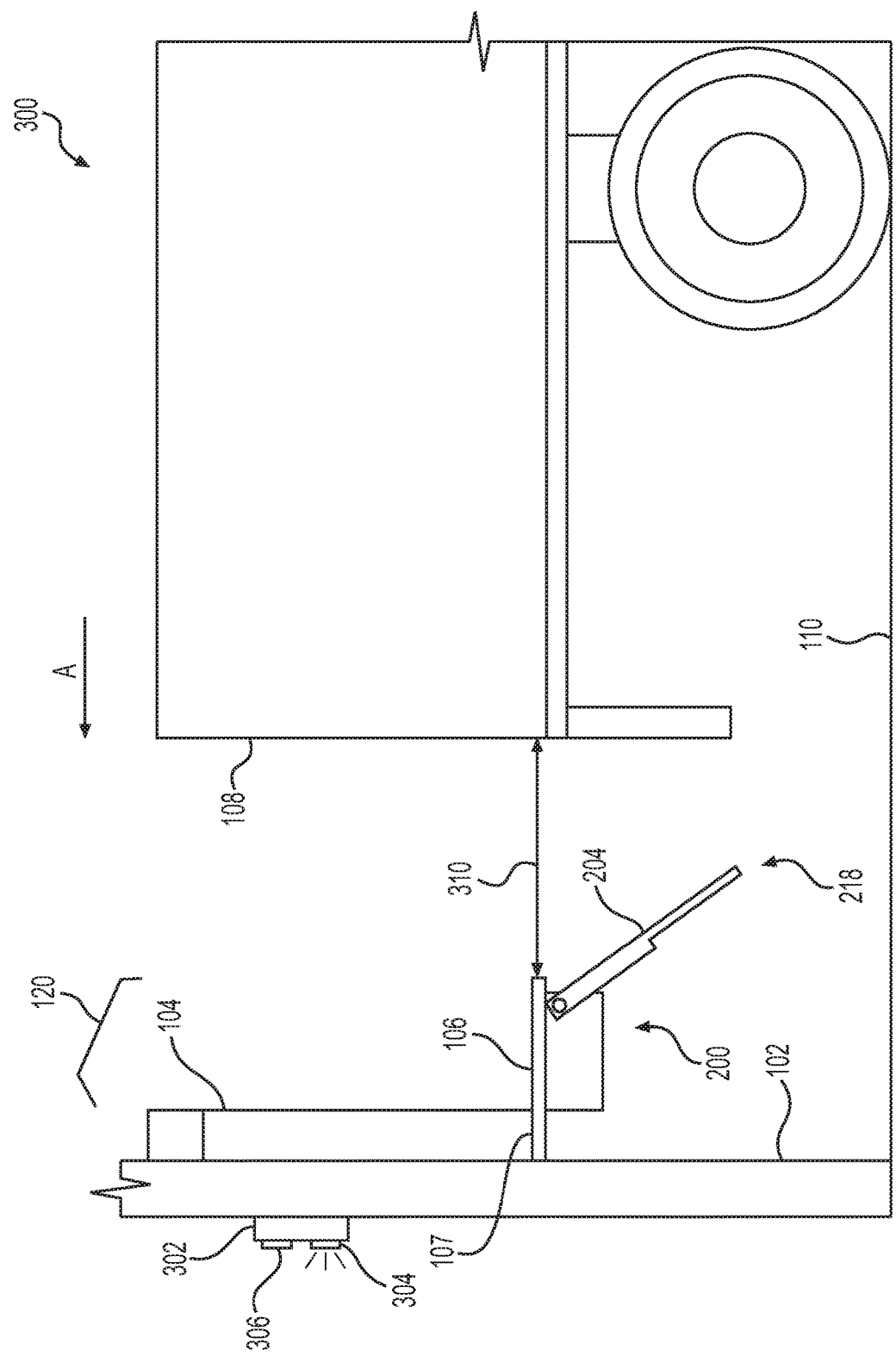

FIG. 3A illustrates an exemplary configuration 300 of loading dock 120 consistent with the present disclosure. Many of the features of configuration 300 are similar to those of configuration 100 discussed above with respect to FIG. 1. In the following, only features of configuration 300 that may be different from those of configuration 100 are discussed in detail. In addition to sensing device 200, loading dock 120 may also include indicating device 302. Indicating device 302 may be configured to indicate a presence of vehicle 108 in loading dock 120 and/or a proximity of vehicle 108 to loading bay 120 and/or loading platform 106. Indicating device 302 may be configured to generate an indication including an audio indication, a visual indication, a signal, or an audio-visual indication. In one exemplary embodiment as illustrated in FIG. 3A, indicating device 302 may include visual indicator 304 (e.g. a light 304) and visual indicator 306 (e.g. light 306).

Visual indicators 304 and 306 may be configured to light up or turn off based on signals received from vehicle sensing device 200. For example, visual indicator 304 may be a first indication, configured to turn on when a distance between vehicle 108 and loading dock 120 (or loading bay 107, loading platform 106, or loading dock wall 102) is more than a threshold distance, as shown, for example, in FIGS. 3A, 3C, and 3E. Visual indicator 306 may be configured to turn on when the distance between vehicle 108 and loading dock 120 (or loading bay 107, loading platform 106, or loading dock wall 102) is less than a threshold distance, as shown, for example, in FIGS. 3B, 3D and 3F. It is contemplated that indicating device 302 may include one visual indicator that turns on when vehicle 108 is at a distance about equal to or at less than a threshold distance and turns off when vehicle 108 is at a distance more than a threshold distance. It is further contemplated that indicating device 302 may include a plurality of visual indicators and one of the plurality of visual indicators, for example, may turn on when a vehicle is at one position relative to the loading dock and turn off when the vehicle is not at the one position. It is contemplated that if an indicating device includes a plurality of indicating devices, one indicating device may wirelessly transmit a message, data, or a signal to another indicating device.

As illustrated in FIG. 3A, vehicle 108 may travel in reverse, in direction A, over driving platform 110 towards loading dock 120. Vehicle 108 may be positioned at a distance 310 from loading dock 120, including loading platform 106, such that vehicle 108 may not be in contact with receiving platform 204 of sensing device 200. As illustrated in FIG. 3A, receiving platform 204 may be oriented in first position 218 when vehicle 108 is not in contact with receiving platform 204. As illustrated, visual indicator 304 may be turned on and visual indicator 306 is turned off when vehicle 108 is positioned at more than a threshold distance from loading dock 120. It is contemplated that in some embodiments, both of visual indicators 304 and 306 may be turned off when vehicle 108 is positioned out of contact with receiving platform 204, and one of visual indicators 304 and 306 may turn on when receiving platform 204 is contacted. One or both visual indicators 304 and 306 may turn on or stay on when vehicle 108 is at less than a threshold distance.

FIG. 3B illustrates another exemplary configuration 320 of loading dock 120 consistent with the present disclosure. Many of the features of configuration 320 are similar to those of configuration 100 and configuration 300 discussed above with respect to FIGS. 1 and 3A, respectively. In the following, only features of configuration 320 that may be different from those of configurations 100 and 300 are discussed in detail. Referring to FIG. 3B, as vehicle 108 continues to travel in direction A, vehicle 108 may come into contact with receiving platform 104. Further movement of vehicle 108 towards loading platform 106 may cause rotation of receiving platform 104 from first position 218, shown in FIG. 3A, to third position 250, shown in phantom in FIG. 3B. In this condition, vehicle 108 may be separated from loading platform 106 by gap 312, which may be smaller than gap 310. As discussed above, in third position 250, inner surface 222 of receiving platform 204 may contact sensor contact 240. When receiving platform 204 contacts sensor contact 240, sensing device 200 may send a signal to indicating device 302, which may cause at least one visual indicator (e.g. visual indicator 306) to light up. Illumination of visual indicator 306 may indicate the presence of vehicle 108 at loading dock 120. Although third position 150 of receiving platform 104 has been associated with activation of visual indicator 306, it is contemplated that in some embodiments visual indicator 306 may be activated as soon as vehicle 108 comes into contact with receiving platform 304 to indicate the presence of vehicle 108 in loading dock 120.

As also illustrated in FIG. 3B, further movement of vehicle 108 in the direction A may continue to rotate receiving platform 204 from third position 250 towards second position 220. As discussed above, rotation of receiving platform 204 from third position 250 toward second position 220 may also cause movement of sensor arms 232, 234 relative to sensor 230. In this condition, vehicle 108 may be separated from loading platform 106 by gap 314. When receiving platform 204 is rotated to second position 220, sensor 230 may send a signal to indicating device 302 to activate (e.g. illuminate) visual indicator 306. Illumination or activation of visual indicator 306 may indicate that vehicle 108 is positioned at an optimum or desired distance from loading platform 106. In this condition, visual indicator 304 may turn off. It is contemplated, however, that in some exemplary embodiments, illumination or activation of visual indicator 306 may not cause visual indicator 304 to be turned off. It is contemplated that in some exemplary embodiments, that if the indicating device includes a plurality of indicating devices, that one indicating device may send a signal to another indicating device.

Sensing device 200 may rely on a threshold distance to activate visual indicator 304. In general, the threshold distance may be a distance at which vehicle 108 is positioned such that loading platform 106 is an optimal or desired distance from a rear structure of vehicle 108 for safe use of passageway 104 by persons or loading and unloading vehicles. In one exemplary embodiment, sensing device 200 may rely on a threshold distance that is larger than gap 314 and smaller than gaps 310 or 312 to activate visual indicator 304. Thus, for example, indicating device 302 may activate visual indicator 304 when a distance (e.g. gap 314) between vehicle 108 and loading platform 106 is less than the threshold distance. It is contemplated that in some exemplary embodiments, gap 314 may define the threshold distance such that indicating device 302 may activate visual indicator 304 when a distance between vehicle 108 and loading platform 106 is less than or about equal to the threshold distance.

Figure 3C:
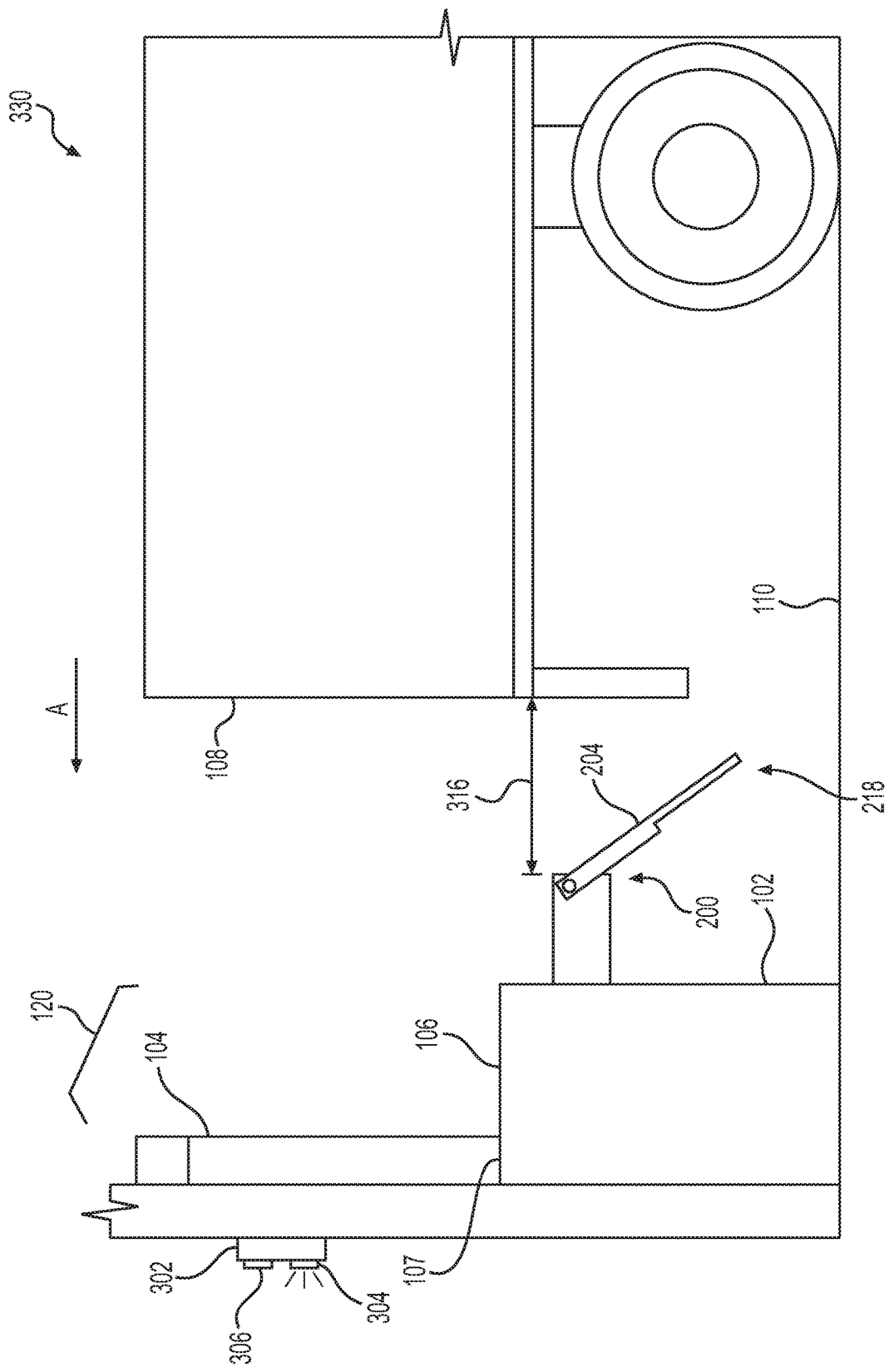
Figure 3D:
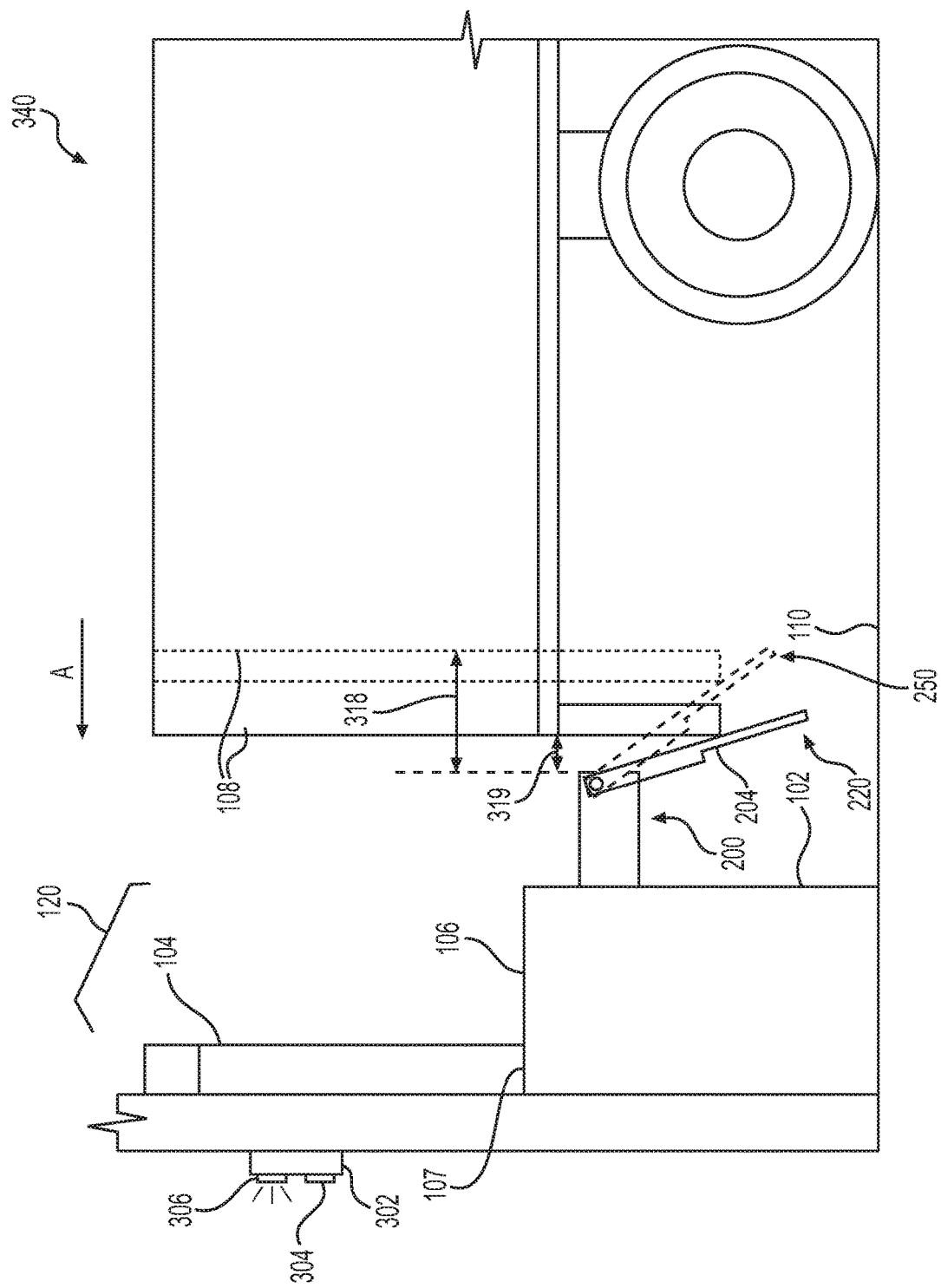
Figure 3E:
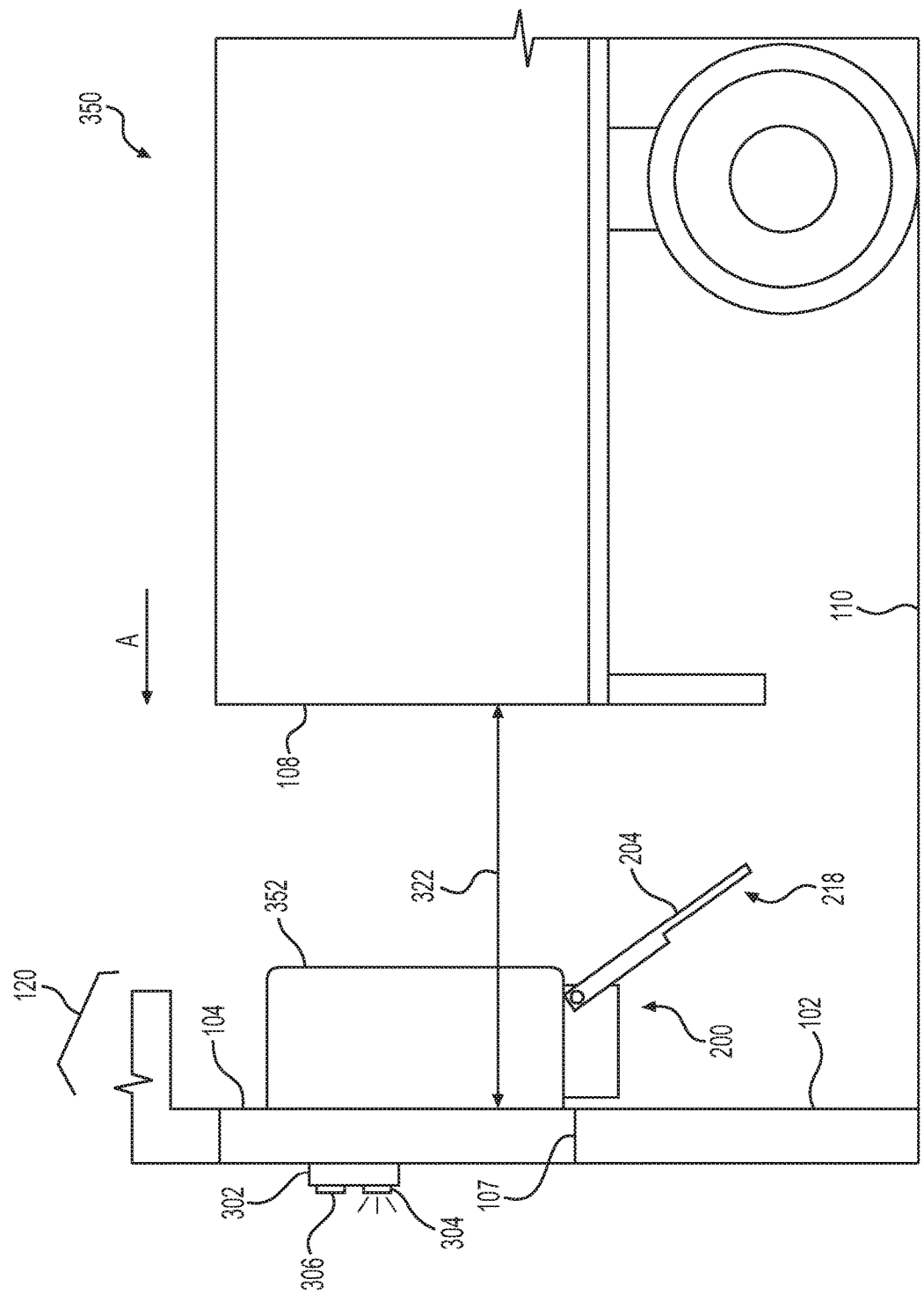

In some exemplary embodiments, the threshold distance may be measured between loading platform 106 and at least one surface of vehicle 108, as illustrated in FIGS. 3A and 3B by gaps 310, 312, and 314, respectively. In other exemplary embodiments, the threshold distance may be measured between sensing device 200 and at least one surface of vehicle 108, as illustrated in FIGS. 3C and 3D by gaps 316, 318, and gap 319, respectively. In other exemplary embodiments, the threshold distance may be measured between loading bay 107 and at least one surface of vehicle 108, as illustrated in FIGS. 3E and 3F by gaps 322, 324, and gap 325, respectively. The at least one surface of vehicle 108 may include, for example, a tire of vehicle 108, a rear structure of vehicle 108, or a door of vehicle 108. In some exemplary embodiments, the threshold distance may range between about 0.5 inch and about 2.0 inch. In other exemplary embodiments, the threshold distance may be substantially less than 0.5 inch to ensure contact occurs between vehicle 108 and at least one of: loading dock 120, sensing device 200, and bumper 352. In yet other exemplary embodiments, the threshold distance may be substantially less than 0.5 inch to ensure contact between vehicle 108 and at least one of: loading dock 120, sensing device 200, and bumper 352.

FIG. 3C illustrates an exemplary configuration 330 of loading dock 120 consistent with the present disclosure. Many of the features of configuration 330 are similar to those of configurations 100 and 300 discussed above with respect to FIGS. 1, and 3A, respectively. In the following, only features of configuration 330 that may be different from those of configuration 100 and 300 are discussed in detail. As illustrated in FIG. 3C, loading platform 106 may protrude from loading bay 107 and sensing device 200 may be attached to loading dock wall 102. Indicating device 302 may be configured to indicate a presence of vehicle 108 at loading dock 120 and/or a proximity of vehicle 108 to loading dock wall 102. It is contemplated that loading platform 106 may end at loading dock wall 102. It is contemplated that loading platform 106 may extend past loading dock wall 102. It is contemplated that vehicle 108 may include a gate or ramp to bridge the gap between vehicle 108 and loading bay 107.

As illustrated in FIG. 3C, vehicle 108 may travel in reverse, in direction A, over driving platform 110 towards sensing device 200. Vehicle 108 may be positioned at a distance 316 from sensing device 120, such that vehicle 108 may not be in contact with receiving platform 204 of sensing device 200. Visual indicator 304 may be turned off and visual indicator 306 may be turned on (e.g. illuminated) when vehicle 108 is positioned out of contact with receiving platform 204. It is contemplated that in some embodiments, visual indicators 304 and 306 may both be turned off when vehicle 108 is positioned out of contact with receiving platform 204.

FIG. 3D illustrates another exemplary configuration 340 of loading dock 120 consistent with the present disclosure. Many of the features of configuration 340 are similar to those of configurations 100 and 330 discussed above with respect to FIGS. 1 and 3C, respectively. In the following, only features of configuration 340 that may be different from those of configurations 100 and 330 are discussed in detail. Referring to FIG. 3D, as vehicle continues to travel in direction A, vehicle 108 may come into contact with receiving platform 104. Further movement of vehicle 108 towards loading dock wall 102 may cause rotation of receiving platform 104 from first position 218 to third position 250 (shown in phantom in FIG. 3B). In this condition, vehicle 108 may be separated from sensing device 200 by gap 318, which may be smaller than gap 316. As discussed above, in third position 250, inner surface 222 of receiving platform 204 may contact sensor contact 240.

As also illustrated in FIG. 3D, further movement of vehicle 108 in the direction A may continue to rotate receiving platform 204 from third position 250 towards second position 220. As discussed above, rotation of receiving platform 204 from third position 250 toward second position 220 may also cause movement of sensor arms 232, 234 relative to sensor 230. In this condition, vehicle 108 may be separated from loading platform 106 by gap 319. It is contemplated that in the configurations 330, 340 the threshold distance is larger than gap 319 and smaller than gaps 316 or 318.

Loading platform 106 in FIG. 3D may be configured to extend from loading dock wall 102 to bridge the distance between vehicle 108 and loading platform 106 once gap 319 is substantially equal or less than the threshold distance. For example, loading platform 106 may include a ramp to extend from fixed portions of loading platform 106 towards vehicle 108. The ramp may be removable. It is contemplated that the ramp may slide from a recess (not shown) below loading platform 106. It is also contemplated that the ramp may fold out towards vehicle 108 from a position proximate the end of loading platform 106 or loading dock wall 102.

FIG. 3E illustrates an exemplary configuration 350 of loading dock 120 consistent with the present disclosure. Many of the features of configuration 350 are similar to those of configurations 100 and 300 discussed above with respect to FIGS. 1 and 3A, respectively. In the following, only features of configuration 350 that may be different from those of configuration 100 and 300 are discussed in detail. Although loading platform 106 is not shown, it is contemplated that loading platform 106 may be used with this configuration. As illustrated in FIG. 3E, loading dock 120 may include one or more bumpers 352 that may project from loading bay 207. Vehicle 108 may be configured to come into contact with the one or more bumpers 352. Bumper 352 may be configured to be on any side of passageway 104 (e.g. above, below, on one side, or on the other side). In some embodiments, bumper 352 may be configured to be on a plurality of sides. Bumper 352 may extend over some or all of dock wall 102. It is also contemplated that bumper 352 may include a plurality of bumpers 352 positioned, for example, on either side of passageway 104.

Vehicle sensing device 200 may be positioned below the one or more bumpers 352. It is contemplated that in some embodiments, vehicle sensing device 200 may be attached to the one or more bumpers 352, to loading dock wall 102, and/or to driving platform 110. It is also contemplated that in some exemplary embodiments, sensing device 200 may be mounted above or one side of bumper 352. It is contemplated that a plurality of sensing devices 200 may be mounted on a plurality of bumpers 352.

As illustrated in FIG. 3E, vehicle 108 may travel in reverse, in direction A, over driving platform 110 towards loading dock 120. Vehicle 108 may be positioned at a distance 322 from loading dock 120, such that vehicle 108 may not be in contact with receiving platform 204 of sensing device 200.

FIG. 3F illustrates another exemplary configuration 360 of loading dock 120 consistent with the present disclosure. Many of the features of configuration 360 are similar to those of configurations 100 and 350 discussed above with respect to FIGS. 1 and 3E, respectively. Although loading platform 106 is not shown, it is contemplated that loading platform 106 may be used with this configuration. In such configurations, loading platform 106 may extend from loading bay 107 to vehicle 108. In the following, only features of configuration 360 that may be different from those of configurations 100 and 300 are discussed in detail. Referring to FIG. 3F, as vehicle continues to travel in direction A, vehicle 108 may come into contact with receiving platform 104. Further movement of vehicle 108 towards loading dock wall 102 may cause rotation of receiving platform 104 from first position 218 to third position 250 (shown in phantom in FIG. 3F). In this condition, vehicle 108 may be separated from sensing device 200 by gap 324, which may be smaller than gap 322. As discussed above, in third position 250, inner surface 222 of receiving platform 204 may contact sensor contact 240. Vehicle 108 may contact receiving platform 204 before contacting bumper 352. It is contemplated that vehicle 108 may contact receiving platform 204 after contacting bumper 352.

As also illustrated in FIG. 3F, further movement of vehicle 108 in the direction A may continue to rotate receiving platform 204 from third position 250 towards second position 220. As discussed above, rotation of receiving platform 204 from third position 250 toward second position 220 may also cause movement of sensor arm 232 relative to sensor 230. In this condition, vehicle 108 may be separated from loading platform 106 by gap 325.

In an exemplary embodiment, the threshold distance may be measured between passageway 104 and at least one surface of vehicle 108, as illustrated in FIGS. 3E and 3F by gaps 324 and 325, respectively. The at least one surface of vehicle 108 may include a tire, a rear structure, a door, or a component proximate the rear of vehicle 108. In configurations 350, 360 the threshold distance may be larger than gap 325 and smaller than gaps 322 or 324.

Although indicating device 302 has been illustrated in FIGS. 3A-3F and described above as including a pair of visual indicators 304, 306, it is contemplated that indicating device may include just one visual indicator 304 or 306, or alternatively may include any number of visual indicators. Visual indicators 304, 306 may include bulbs, light emitting diodes (LEDs), or may be in the form of visual icons displayed on a display device such as a screen of an electronic device, such as, a computer, a mobile phone, a tablet, or any other type of electronic display device. When indicating device includes only one visual indicator 304 or 306, indicating device may provide indications regarding detection of vehicle 108 and proximity of vehicle 108 to loading platform 106 using different colors, shapes, or other visual elements that may include icons or animations.

Further, although indicating device 302 has been illustrated in FIGS. 3A-3D as including visual indicators, the configuration of indicating device may not be so limited. For example, indicating device 302 may include components that may generate audible alerts corresponding to different positions of vehicle 108 in loading dock 102. It is further contemplated that indicating device 302 may be an audio-visual device that may generate both visual and audible indications. Thus, for example, indicating device 302 may include one or more visual indicators 304, 306 together with components that may produce audible alerts.

As illustrated in the exemplary embodiments of FIGS. 3A-3D, indicating device 302 may be disposed on or adjacent to passageway 104. It is also contemplated that indicating device 302 may be positioned to allow an operator of vehicle 108 to see and/or hear indicating device 302 from within an operator cabin of vehicle 108 (e.g. using one or more rear view mirrors).

Figure 4:
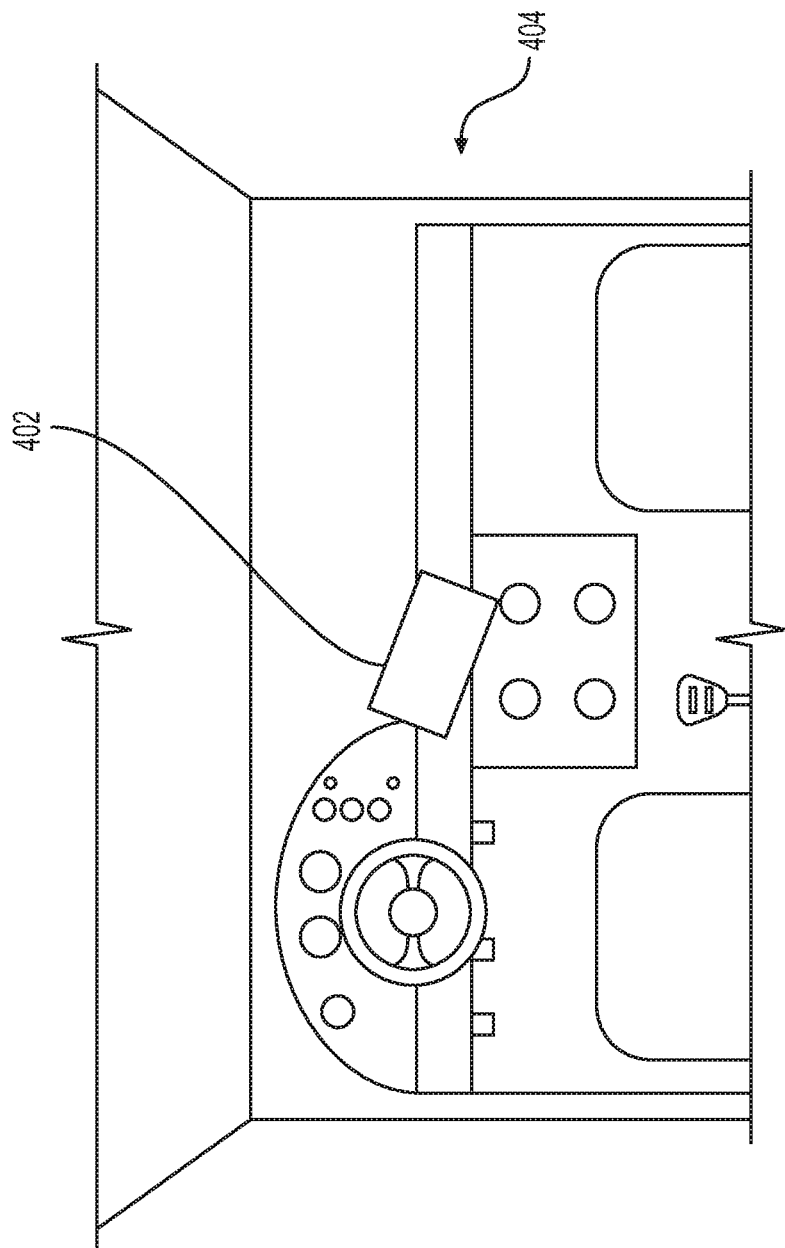
FIG. 4 illustrates an exemplary embodiment of an indicating device.

In some exemplary embodiments, indicating device 302 may be positioned within an operator's cabin of vehicle 108. For example, indicating device 302 may be in the from of a display screen in vehicle 108. Additionally or alternatively, indicating device 302 may be included in a mobile phone, tablet computer, portable computer, or other electronic device located in the operators cabin of vehicle 108. For example, the indicating device 302 in vehicle 108 may receive signals from sensing device 200. FIG. 4 illustrate an exemplary electronic device 402 located within operator's cabin 404 of vehicle 108. It is also contemplated that in some exemplary embodiments, electronic device 402 may additionally or alternatively be located in at least one of a control room or loading dock 120.

Sensing device 200 may be configured to send signals to indicating device 302 via a wired or wireless connection. For example, sensing device 200 may be connected to indicating device 302 by one or more wires electrically connecting sensing device 200 to indicating device 302. The one or more wires may transmit signals in the form of voltages, currents, etc. to indicate detection of the presence of vehicle 108 or detection of the proximity of vehicle 108 to loading platform 106. Sensing device 200 or sensor 230 may wirelessly transmit signals to an indicating device (e.g. indicating device 302 or indicating device 402).

In some exemplary embodiments, sensing device 200 may include a communication device with wireless communication capability, and the communication device may be capable of receiving a signal from a sensor, such as sensor 230. The communication device associated with sensing device 200 may contain a processor and memory to execute small applications that may perform various functions, including checking for faults and/or converting data for transmission. The communication device associated with sensing device 200 may include one or more wireless transceivers capable of transmitting and receiving wireless signals. Likewise, indicating device 302 may include one or more wireless transceivers. Sensing device 200 may transmit signals wirelessly to indicating device 302 using at least one of a radio signal, an infrared signal, a Bluetooth signal, a WiFi signal, or a cellular signal over a variety of networks. In some exemplary embodiments, sensing device 200 may transmit a signal to a computer that may transmit the signal over the internet to indicating device 302. Additionally, or alternatively, sensing device 200 may include a transceiver that may wirelessly transmit a signal to a cellular phone that may in turn transmit the signal over a cellular network to indicating device 302. The signal may include a message or a data packet. Indicating device 302 may include wireless transmission capabilities such as a transceiver for transmission to one of a plurality of indicating devices.

In some exemplary embodiments, loading dock 120 may include a plurality of sensing devices 200, wherein each of the plurality of sensing devices 200 is configured to if vehicle 108 is at a distance less than or about equal to a threshold distance from loading dock 120. In some embodiments, the plurality of sensing devices 200 may be located proximate each other. In other embodiments, one of the plurality of sensing devices 200 may be located proximate a top of vehicle 108 and another may be located proximate a bottom of vehicle 108. It is also contemplated that in some exemplary embodiments, one of the plurality of sensing devices 200 may be located proximate one side of a rear structure of vehicle 108 and another of the plurality of sensing devices 200 may be located proximate another side of the rear structure of vehicle 108.

FIGS. 5A-5F illustrate non-limiting examples of sensors that may be included in sensing device 200. For example, FIG. 5A illustrates sensor assembly 500 including sensor arms 232 and 234, which may have a configuration similar to that discussed above with respect to, for example, FIG. 2B. FIG. 5A illustrates a configuration in which sensor arms 232 and 234 are in an extended position, for example because of a biasing force. FIG. 5B illustrates a configuration in which sensor arms 232 and 234 are in a retracted position, for example, because sensor contact 240 and/or joint 242 may have been moved towards sensor 230 by receiving platform 204. Sensor 230 may be configured to measure the position of sensor contact 240 relative to sensor 230 based on an amount of movement of one or more of sensor arms 232, 234. Although FIGS. 5A and 5B illustrate two positions of sensor arms 232, 234, it is contemplated that sensor arms 232, 234 may be positioned in any position between a fully extended position as illustrated in FIG. 5A and fully retracted position as illustrated in FIG. 5B.

FIG. 5C illustrates an exemplary sensor assembly 520, which may be included in vehicle sensing device 200. Sensor assembly 520 may include sensor 530, transmitter 522, and receptor 524. Transmitter 522 of sensor 530 may be configured to transmit beam 526. Beam 526 may include a light beam, a sound wave (e.g. ultrasonic wave), etc. Beam 526 may impinge on one or more surfaces of a receiving platform (e.g. receiving platform 204), including, for example, back surface 222, and may be reflected by receiving platform 204. Receiver 524 of sensor 530 may be configured to receive one or more reflections of beam 526 from a receiving platform (e.g. receiving platform 204). Sensor 530 may be configured to measure a distance of vehicle 108 from loading platform 120 based on characteristics of the reflections received at receiver 524. Such characteristics may include, for example, an amplitude, a wavelength, a frequency, an energy content, etc. Sensor 530 may be configured to determine the distance based on absolute measurements of these characteristics and/or by comparing the characteristics of the received reflections with corresponding characteristics of beam 526 emitted by transmitter 522. A receiving platform (e.g. receiving platform 204) may include one or more reflective strips to help enhance reflection of beam 526.

In some exemplary embodiments, a receiving platform (e.g. receiving platform 204) may include one or more openings to allow beam 526 to pass through. In such embodiments, beam 526 may impinge on one or more surfaces of vehicle 108 and may be reflected by vehicle 108. Receiver 524 of sensor 530 may be configured to receive one or more reflections of beam 526 from vehicle 108. Sensor 530 may be configured to measure a distance of vehicle 108 from loading platform 106 based on characteristics of the reflections received at receiver 524.

FIG. 5D illustrates sensor assembly 540 that may be included in vehicle sensing device 200. Sensor assembly 540 may include sensor 550, sensor arm 546, sensor spring 548, and sensor contact 544. Sensor arm 546 may extend from body 550 and may be configured to retract and extend, as shown, for example, in FIGS. 5D and 5E, respectively. Sensor spring 548 may be configured to bias sensor arm 546 towards an extended position. Sensor assembly 540 may be configured to detect when sensor arm 546 retracts and extends. Sensor assembly 540 may be configured to measure the position of sensor contact 544 based on a movement of sensor arm 546. It is contemplated that sensor arm 546 may be a flexible arm or a telescoping arm. Sensor arm 546 may be configured to pass through the center of sensor spring 548. Sensor contact 544 may be fixedly attached to sensor arm 546. Sensor contact 544 may be configured to contact a receiving platform (not shown). FIG. 5E illustrates a movement of sensor contact 544, for example, when receiving platform 204 contacts sensor contact 544 and moves sensor contact 544 towards sensor 550. Sensor arm 546 may substantially retract causing sensor contact 544 to move substantially. Although FIGS. 5D and 5E illustrate two positions of sensor arm 546, it is contemplated that sensor arm 546 may be positioned in any position between a fully extended position as in FIG. 5D and fully retracted position as in FIG. 5E.

FIG. 5F illustrates sensor assembly 580 that may be included in vehicle sensing device 200. Sensor assembly 580 may include sensor arm 582, movable arm 584, and sensor contact 586. Fixed arm 582 may be fixedly attached to sensor 570. Movable arm 584 may be rotatably attached to fixed arm 582. Movable arm 584 may be configured to rotate between an extended position 590 and a withdrawn position 592 (in phantom). A spring (not shown) may be configured to bias movable arm 584 towards an extended position 590. Sensor assembly 580 may be configured to detect when movable arm 584 rotates between extended position 590 and retracted position 592. Sensor 580 may be configured to measure a position of sensor contact 586 based on the movement of sensor arm 584, for example, by including an encoder that measures a rotation of sensor arm 584 around joint 585. Sensor contact 586 may be attached to sensor arm 584. Sensor contact 586 may be configured to contact a receiving platform (e.g. receiving platform 204). It is contemplated that sensor arm 584 may be connected to sensor 570. In such embodiments, joint 585 may be within or immediately adjacent sensor 570.

Figure 6A:
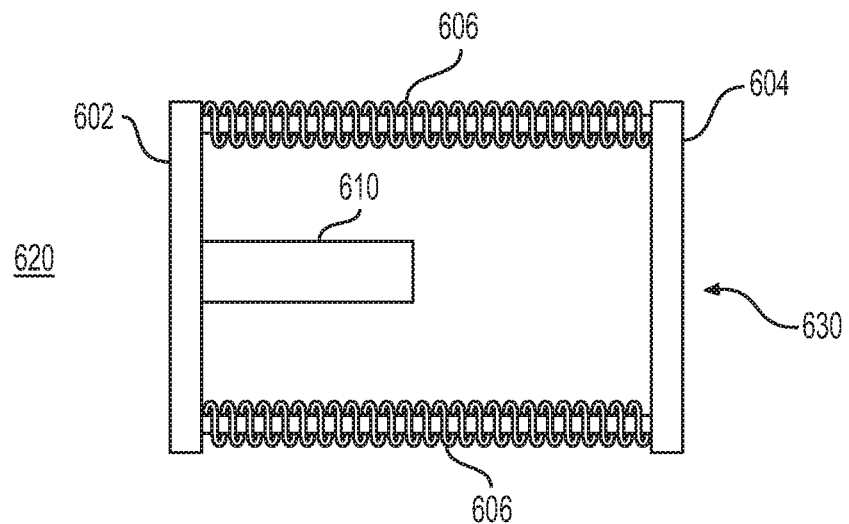
FIGS. 6A-6C illustrate exemplary embodiments of a sensing device.
Figure 6B:
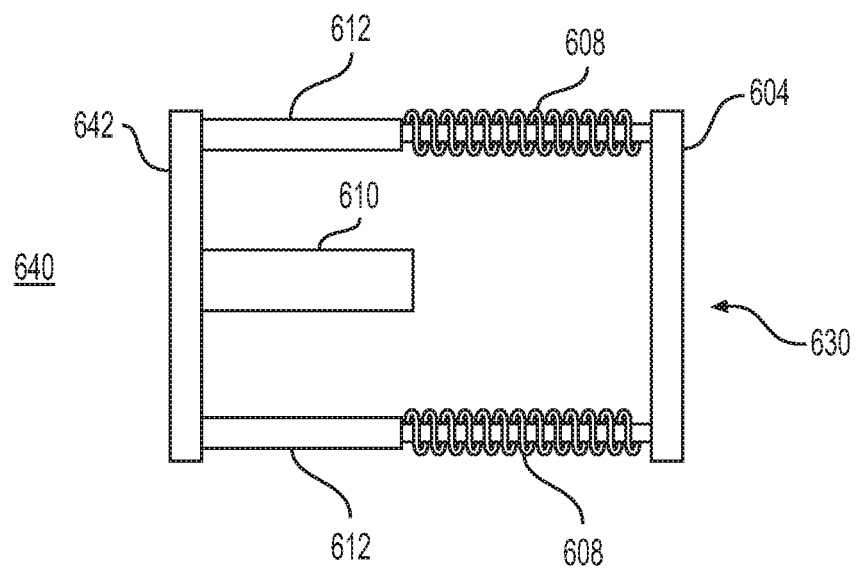
Figure 6C:
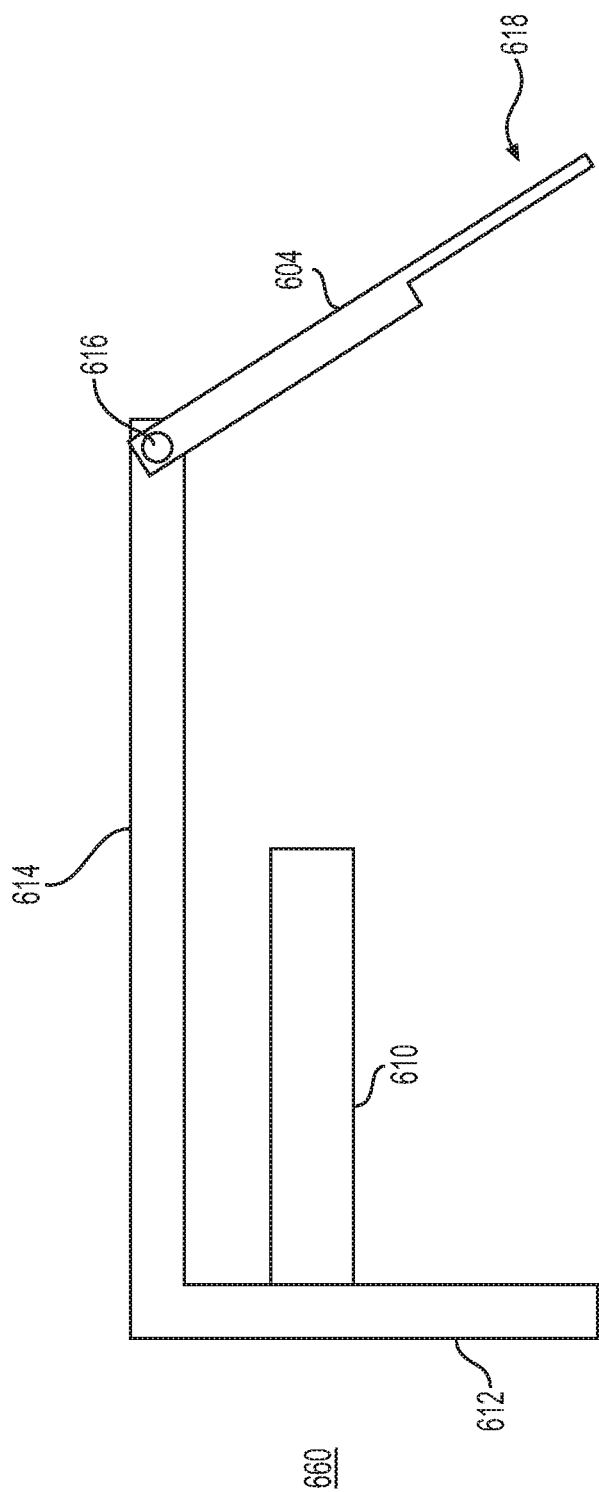

FIGS. 6A-6C show non-limiting examples of vehicle sensing devices. FIGS. 6A-6C illustrate simplified sensing devices 620, 640, and 660 including base 602, sensor 610, and receiving platform 604. Other components of sensing devices 620, 640, and 660 have been omitted to facilitate clarity of the description.

FIG. 6A illustrates an exemplary embodiment of vehicle sensing device 620 that may be used in addition to or instead of vehicle sensing device 200 in the one or more configurations of, for example, FIGS. 3A-3F. Base 602 may be attached to a loading dock wall (not shown), exemplified as loading dock wall 102. Base 602 may be connected to a receiving platform 604 by one or more springs 606. Receiving platform 604 may be biased towards a first position 630 extended away from loading dock wall 102 by springs 606. Receiving platform 604 may move to a second position, nearer to loading dock wall 102 as springs 606 retract. Sensing device 620 may include sensor 610 that detects a position of receiving platform 604. It is contemplated that sensor 610 may detect contact of receiving platform 604. One or more of the sensors discussed above, for example, with respect to FIGS. 5A-5F may be included in vehicle sensing device 620 for detecting a position of receiving platform 604.

FIG. 6B illustrates an exemplary embodiment of vehicle sensing device 640 that may be used in addition to or instead of vehicle sensing device 200 in the one or more configurations of, for example, FIGS. 3A-3F. Base 602 of vehicle sensing device 640 may be attached to a loading dock wall (e.g. dock wall 102). Base 602 may be connected to a receiving platform 604 by telescoping structures 612. Receiving platform 604 may be biased towards a first position 630 extended away from dock wall 102 by springs 608. Receiving platform 604 may move to a second position nearer to dock wall 102 as telescoping structures 612 and springs 608 retract. Sensing device 640 may include sensor 610 that detects a position of receiving platform 604. It is contemplated that sensor 610 may detect contact of receiving platform 604. One or more of the sensors discussed above, for example, with respect to FIGS. 5A-5F may be included in vehicle sensing device 640 for detecting a position of receiving platform 604.

FIG. 6C illustrates an exemplary embodiment of vehicle sensing device 660 that may be used in addition to or instead of vehicle sensing device 200 in the one or more configurations of, for example, FIGS. 3A-3F. Base 602 may be attached to a loading dock wall (e.g. loading dock wall 102). Base 602 may be connected to a receiving platform 604 by fixed structure 614. Receiving platform 604 may be rotatably connected to fixed structure 614 around shaft 616. Receiving platform 604 may be biased towards a first position 618 away from the loading dock wall by springs (not shown). Receiving platform 604 may move to a second position nearer to the loading dock wall as receiving platform 604 rotates around shaft 616. Sensing device 660 may include sensor 610 that may detect the position of receiving platform 604. One or more of the sensors discussed above, for example, with respect to FIGS. 5A-5F may be included in vehicle sensing device 660 for detecting a position of receiving platform 604.

Figure 7A:
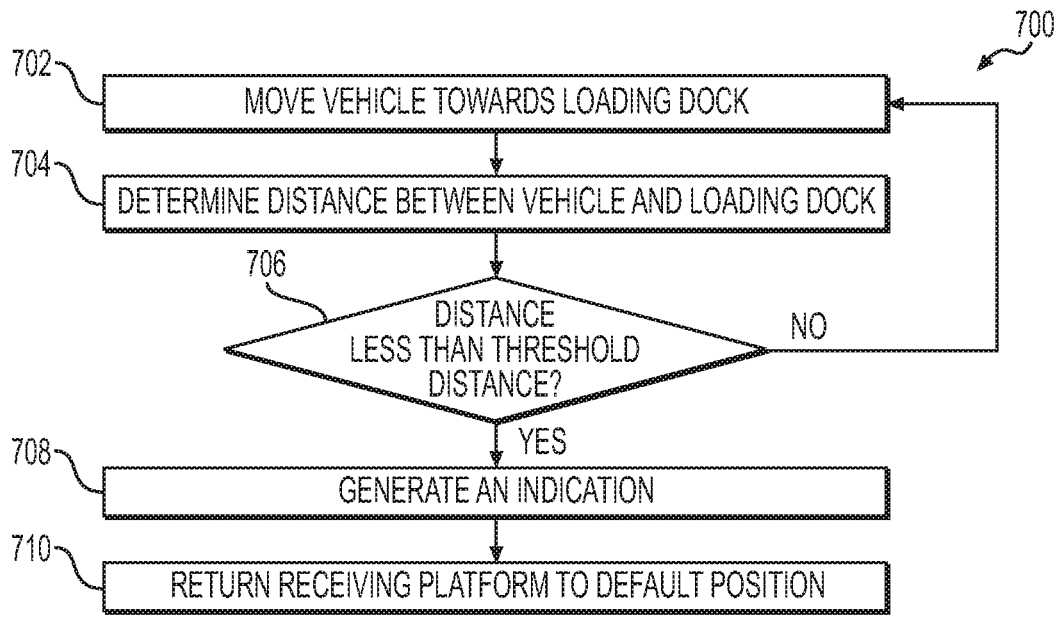
FIGS. 7A and 7B illustrate exemplary embodiments of methods of sensing a proximity of a vehicle.
Figure 7B:
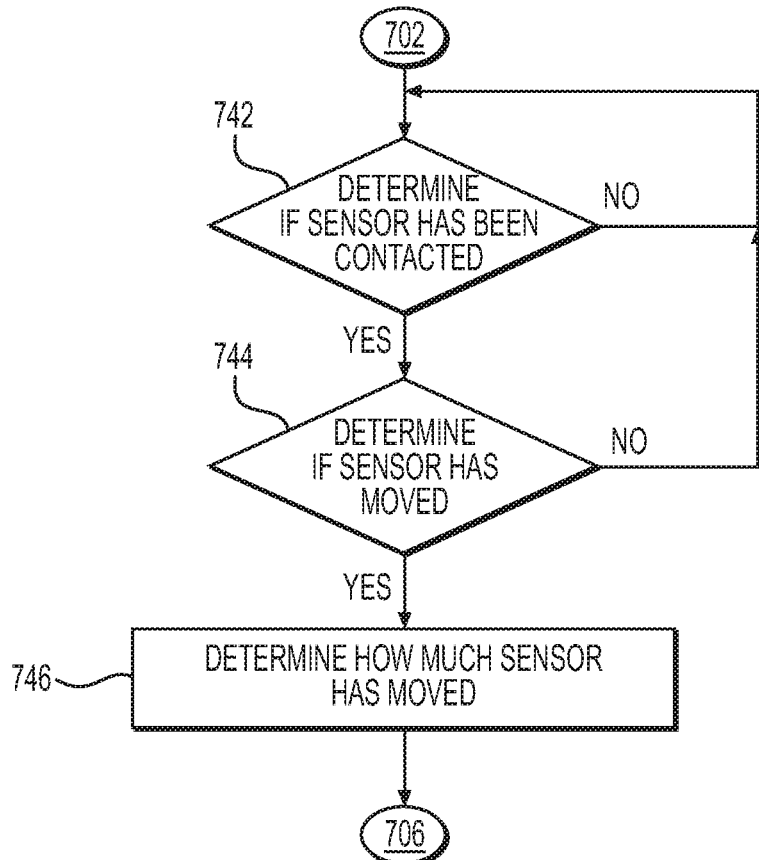

FIGS. 7A and 7B shows an exemplary embodiment of a method 700 of sensing a proximity of a vehicle. The order and arrangement of steps in method 700 are provided for purposes of illustration. As will be appreciated from this disclosure, modifications may be made to method 700 by, for example, adding, combining, removing, and/or rearranging the steps for method 700.

Method 700 may include a step 702 of moving a vehicle towards a loading dock. For example, vehicle 108 may be driven over driving platform 110 associated with loading dock 120. In some exemplary embodiments, vehicle 108 may be moved in a reverse travel direction towards loading dock 120 (see e.g. FIG. 3A) such that a trailer end of vehicle 108 may be located nearer to loading dock 120 compared to an operator's cabin (e.g. operator's cabin 404) of vehicle 108. Method 700 may include a step 704 of determining a distance between the vehicle and the loading dock. In step 704, a sensing device (e.g. sensing device 200) may be used to determine a distance between vehicle 108 and loading dock 120. In one exemplary embodiment, sensing device 200 may include body 202, and a sensor 230, which may include receiving platform 204.

A sensor may determine the distance between the vehicle and the loading dock 704 by a series of steps illustrated in FIG. 7B. For example, a sensor (e.g. sensor 230) may determine if a sensor contact (e.g. sensor contact 240) has been contacted by a receiving platform (step 742). When the sensor determines that the sensor contact has not been contacted by the receiving platform (step 742: No), method 700 may return to step 742. When the sensor determines, however, that the sensor contact has been contacted by the receiving platform (step 742: Yes), method 700 may proceed to step 744. In step 744, a sensor (e.g. sensor 230) may determine if a sensor contact (e.g. sensor contact 240) has been moved from its initial or default position. When the sensor determines that the sensor contact has not been moved from its initial position (step 744: No), method 700 may return to step 742. When the sensor determines, however, that the sensor contact has been moved from its initial position (step 744: Yes), method 700 may proceed to step 746. The sensor (e.g. sensor 230) may determine a distance by which sensor contact (e.g. sensor contact 240) has been moved from its initial position (step 746). Method 700 may proceed to step 708 from step 746. It is contemplated that step 746 that the sensor (e.g. sensor 230) may determine if sensor contact (e.g. sensor contact 240) has moved a predetermined distance.

It is contemplated that one or more of the sensors described with respect to, for example, FIGS. 5A-5E and sensing devices described with respect to, for example, 6A-6C may be used to determine if sensor contact (e.g. sensor contact 240) has been contacted and/or moved. Information from steps 742, 744, and 746 may be used in other steps, such as step 706. Steps 742, 744, and/or 746 may occur in reverse order or may occur simultaneously. It is also contemplated that in some exemplary embodiments, step 704 may not include any of steps 742, 744, or 746 or may include only a subset of steps 742, 744, and 746.

Method 700 may include a step 706 of determining whether the distance between the vehicle (e.g. vehicle 108) and the loading dock (e.g. loading dock 120) is less than a threshold distance. The sensor (e.g. sensor 230) may be configured to determine the distance that the sensor contact (e.g. sensor contact 240) has moved to determine if the distance of the vehicle from the loading dock is less than a threshold distance. In such embodiments, the threshold distance may be a predetermined number. It is contemplated that the sensor may be configured to compare an input threshold distance to the distance that the sensor contact (e.g. sensor contact 240) has moved. It is also contemplated that the sensor may measure a movement of receiving platform 204, for example, through the use of an optical sensor. When the distance between vehicle 108 and loading platform 106 (e.g. gap 314, as shown in FIG. 3A) is less than the threshold distance (step 706: Yes), method 700 may proceed to step 708. When the distance between vehicle 108 and loading platform 106 (e.g. gap 310 or 312, as shown in FIG. 3B), however, is more than the threshold distance (step 706: No), method 700 may return to step 702.

At step 708, the indicating device may generate an indication if the distance is substantially equal or less than a threshold distance. In some embodiments, generating an indication 708 may include generating at least one of a visual indication, an audible indication, an electronic signal, or an audio-visual indication using, for example, indication device 302.

In some exemplary embodiments, after or during when the vehicle moves away from the loading dock, the receiving platform may return to a default position (e.g. first position 218), as shown in FIG. 3A (step 710). In some embodiments, returning the receiving platform to a receiving position may include at least one of: moving the receiving platform in a direction substantially perpendicular to a loading dock wall or moving the receiving platform in a substantially rotational motion. In some embodiments, returning the receiving platform to a receiving position may include the use of at least one of: a spring, a magnet, or an actuator.

In some embodiments, step 710 may be omitted, such that method 700 does not return the receiving platform to a receiving position. Such embodiments may include a step of moving the receiving platform to a new position to receive a new trailer of expected dimensions. Such embodiments may be useful when the new trailer of expected dimensions has different dimensions than the trailer before it.

Determining a distance between the vehicle and the loading dock may include one or more fault detection steps (not shown in method 700). Faults may lead to false vehicle detection due to interruptions or errors from external sources, such as misalignment of a sensor, a loss of electrical power, malfunctioning sensors, or intentional stoppage of loading or unloading operations. When a fault is detected, an alert may be created to alert an operator of the fault.

It will be apparent to those skilled in the art that various modifications and variations can be made to the disclosed loading dock, vehicle proximity sensing device, and method of vehicle proximity sensing. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A loading dock, comprising:
   a loading bay;
   a driving platform configured to receive a vehicle approaching the loading bay, wherein the driving platform is beneath the loading bay;
   a receiving platform configured to contact the vehicle, wherein the receiving platform is beneath the loading bay;
   a sensor attached to the loading bay, wherein the sensor is configured to determine if a distance between the vehicle and the loading bay is less than a threshold distance by detecting a change of position of the receiving platform; and
   an audible alert configured to sound or a light configured to turn on when the distance between the vehicle and the loading bay is less than the threshold distance.

2. The loading dock of claim 1, wherein the receiving platform is movably attached to the sensor base.

3. The loading dock of claim 2, further including a spring configured to apply a biasing force on the receiving platform.

4. The loading dock of claim 3, wherein the spring includes one of a torsional spring or a substantially linear spring.

5. The loading dock of claim 2, wherein the receiving platform is pivotably connected to the sensor base at one end, the receiving platform projecting from the one end to an opposite end.

6. The loading dock of claim 5, wherein the receiving platform is inclined relative to the sensor base before being contacted by the vehicle.

7. The loading dock of claim 2, wherein the receiving platform is configured to move relative to the sensor base via at least one of a substantially linear motion, a substantially rotational motion, or a telescopic motion.

8. The loading dock of claim 2, wherein the sensor includes at least one of an optical sensor, a movable sensor, a thermal sensor, or an electronic sensor.

9. The loading dock of claim 1, wherein:
   the distance between the vehicle and the loading bay is more than the threshold distance when the receiving platform is in the first position; and
   the distance between the vehicle and the loading bay is less than the threshold distance when the receiving platform is in the second position.

10. The loading dock of claim 1, further including a loading platform projecting from the loading bay, wherein the sensor is attached to the loading platform.

11. The loading dock of claim 1, further including a wall extending between the loading bay and the driving platform, wherein the sensor is attached to the wall.

12. The loading dock of claim 1, wherein the light comprises a first light reflecting a first position of the receiving platform and a second light reflecting a second position of the receiving platform.

13. The loading dock of claim 1, further including at least one bumper, wherein the at least one bumper is configured to be positioned between the vehicle and the loading bay.

14. A sensor, comprising:
   a base configured to be connected to a loading dock;
   a receiving platform configured to contact the vehicle, wherein the receiving platform is beneath the loading dock;
   a sensor attached to the base, wherein the sensor is configured to determine if a vehicle is at a distance less than a threshold distance from the loading dock by detecting a change of position of the receiving platform; and
   an audible alert configured to sound or a light configured to turn on when the vehicle is at the distance less than the threshold distance from the loading dock.

15. The sensor of claim 14, further including:
   a biasing member configured to apply a biasing force on the receiving platform.

16. The sensor of claim 15, wherein the biasing member includes one of a torsional spring or a substantially linear spring.

17. The sensor of claim 14, wherein the receiving platform is pivotably connected to the base.

18. The sensor of claim 14, wherein the receiving platform is configured to be inclined relative to the base before being contacted by the vehicle.

19. The sensor of claim 14, wherein the receiving platform is configured to rotate from a first position to a second position.

20. The sensor of claim 19, wherein:
   the distance between the vehicle and the loading dock is more than the threshold distance when the receiving platform is in the first position; and
   the distance between the vehicle and the loading dock is less than the threshold distance when the receiving platform is in the second position.

21. The sensor of claim 20, wherein:
   the audible alert or the light is configured to generate a second indication when the distance between the vehicle and the loading dock is more than the threshold distance; and
   the audible alert or the light is configured to generate a first indication when the distance between the vehicle and the loading dock is less than the threshold distance.

22. The sensor of claim 14, wherein the indication includes an electronic signal.

23. The sensor of claim 22, wherein the sensor is configured to wirelessly transmit the electronic signal.

24. The sensor of claim 23, wherein the electronic signal is transmitted as at least one of a radio signal, an infrared signal, a Bluetooth signal, a WiFi signal, or a cellular signal.

25. The sensor of claim 23, further comprising an indication panel, a mobile device, a mobile application, or a computer comprising:
   a wireless receiver configured to receive the electronic signal transmitted by the sensor.

26. The sensor of claim 23, wherein the audible alert or the light is located in at least one of the vehicle, a control room, or a loading bay.

27. The sensor of claim 14, further including at least one of an optical sensor, a movable sensor, a thermal sensor, or an electrical sensor.

28. The sensor of claim 14, wherein the light includes:
   a first light configured to turn on when the distance between the vehicle and the loading dock is greater than the threshold distance; and
   a second light configured to turn on when the distance between the vehicle and the loading dock is less than or about equal to the threshold distance.

29. The sensor of claim 14, wherein the threshold distance ranges between about 0.5 inch and about 2.0 inch.

30. A method of sensing a proximity of a vehicle to a loading dock, the method comprising:
   moving the vehicle towards the loading dock on a driving platform associated with the loading dock;
   a receiving platform configured to contact the vehicle, wherein the receiving platform is beneath the loading dock;
   determining, using a sensor connectedly attached to the loading dock, a distance between the vehicle and the loading dock by detecting a change of position of the receiving platform;
   determining whether the distance is less than a threshold distance; and
   generating, using an audio or visual indicator, an indication if the distance is less than the threshold distance.

31. The method of claim 30, wherein the threshold distance is less than two inches.

32. The method of claim 30, wherein generating the indication includes sending a signal wirelessly from the sensor to the audio or visual indicator.

33. The method of claim 30, further including
   returning the receiving platform to a receiving position when the vehicle has moved away from a loading dock.

34. The method of claim 30, wherein generating the indication includes turning on a light configured to indicate the presence of the vehicle.

\* \* \* \* \*